United States Patent
Karabinis

(10) Patent No.: US 8,660,169 B1
(45) Date of Patent: *Feb. 25, 2014

(54) SYSTEMS/METHODS OF ADAPTIVELY VARYING A BANDWIDTH AND/OR FREQUENCY CONTENT OF COMMUNICATIONS

(71) Applicant: EICES Research, Inc., Cary, NC (US)

(72) Inventor: Peter D. Karabinis, Cary, NC (US)

(73) Assignee: EICES Research, Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,138

(22) Filed: Oct. 31, 2013

Related U.S. Application Data

(63) Continuation of application No. 13/780,480, filed on Feb. 28, 2013, now Pat. No. 8,576,940, which is a continuation of application No. 13/011,451, filed on Jan. 21, 2011, which is a continuation-in-part of application No. 12/372,354, filed on Feb. 17, 2009, now Pat. No. 7,876,845, which is a continuation-in-part of application No. 11/720,115, filed as application No. PCT/US2006/020417 on May 25, 2006, now Pat. No. 8,050,337.

(60) Provisional application No. 61/033,114, filed on Mar. 3, 2008, provisional application No. 60/692,932, filed on Jun. 22, 2005, provisional application No. 60/698,247, filed on Jul. 11, 2005.

(51) Int. Cl.
*H04B 1/38* (2006.01)
*H04L 5/16* (2006.01)

(52) U.S. Cl.
USPC ............................................. 375/219; 455/73

(58) Field of Classification Search
USPC .......................................................... 375/219
See application file for complete search history.

(56) References Cited

U.S. PATENT DOCUMENTS

| 4,635,276 A | 1/1987 | Karabinis |
| 5,029,184 A | 7/1991 | Andren et al. |

(Continued)

FOREIGN PATENT DOCUMENTS

| EP | 0 869 647 A2 | 10/1998 |
| EP | 1 328 071 A1 | 7/2003 |

(Continued)

OTHER PUBLICATIONS

3G Americas, "UMTS Evolution from 3GPP Release 7 to Release 8 HSPA and SAE/LTE", Jul. 2007, 89 pp.

(Continued)

*Primary Examiner* — Erin File
(74) *Attorney, Agent, or Firm* — Meyers Bigel Sibley & Sajovec, P.A.

(57) ABSTRACT

A bandwidth that is allocated to a transmitted waveform need not be contiguous in frequency space and a frequency content of the transmitted waveform may vary, as needed, even on a signaling interval by signaling interval basis, in order to accommodate a desired transfer rate, reduce or avoid interference and/or enhance an end user experience. According to embodiments of the invention, a set of frequencies that is used to provide frequency content to elements of a waveform alphabet, used to form the transmitted waveform, is varied thus varying a frequency content of the transmitted waveform. A time span associated with the elements of the waveform alphabet may also be varied. Various transmitter/receiver embodiments are disclosed including direct synthesis transmitter/receiver embodiments.

80 Claims, 9 Drawing Sheets

(56) References Cited

U.S. PATENT DOCUMENTS

| | | | |
|---|---|---|---|
| 5,117,401 A | 5/1992 | Feintuch | |
| 5,394,433 A | 2/1995 | Bantz et al. | |
| 5,559,828 A | 9/1996 | Armstrong et al. | |
| 5,778,029 A * | 7/1998 | Kaufmann | 375/296 |
| 5,848,160 A | 12/1998 | Cai et al. | |
| 5,966,312 A | 10/1999 | Chen | |
| 6,140,935 A | 10/2000 | Hayton et al. | |
| 6,141,567 A * | 10/2000 | Youssefmir et al. | 455/562.1 |
| 6,198,730 B1 | 3/2001 | Hogberg et al. | |
| 6,243,370 B1 | 6/2001 | Schilling | |
| 6,295,461 B1 | 9/2001 | Palmer et al. | |
| 6,389,002 B1 | 5/2002 | Schilling | |
| 6,407,989 B2 | 6/2002 | Schilling | |
| 6,433,720 B1 | 8/2002 | Libove et al. | |
| 6,466,629 B1 | 10/2002 | Isaksson et al. | |
| 6,473,449 B1 * | 10/2002 | Cafarella et al. | 375/141 |
| 6,484,260 B1 | 11/2002 | Scott et al. | |
| 6,661,847 B1 | 12/2003 | Davis et al. | |
| 6,711,145 B2 | 3/2004 | Schilling | |
| 6,765,895 B1 | 7/2004 | Watanabe | |
| 6,765,969 B1 | 7/2004 | Vook et al. | |
| 6,799,141 B1 | 9/2004 | Stoustrup et al. | |
| 6,922,570 B2 | 7/2005 | Awater et al. | |
| 6,965,992 B1 * | 11/2005 | Joseph et al. | 713/153 |
| 7,020,125 B2 | 3/2006 | Schilling | |
| 7,020,165 B2 | 3/2006 | Rakib et al. | |
| 7,113,601 B2 * | 9/2006 | Ananda | 380/282 |
| 7,145,933 B1 | 12/2006 | Szajnowski | |
| 7,155,340 B2 | 12/2006 | Churan | |
| 7,218,693 B2 | 5/2007 | Troulis | |
| 7,292,627 B2 | 11/2007 | Tzannes | |
| 7,295,637 B2 | 11/2007 | Papathanasiou et al. | |
| 7,333,422 B2 | 2/2008 | Amer | |
| 7,362,695 B2 | 4/2008 | Akahori | |
| 7,362,829 B2 | 4/2008 | Ojard | |
| 7,418,053 B2 | 8/2008 | Perlman et al. | |
| 7,454,175 B2 | 11/2008 | Karabinis | |
| 7,483,672 B2 | 1/2009 | Hart et al. | |
| 7,505,522 B1 | 3/2009 | Larsson | |
| 7,561,212 B2 | 7/2009 | Nakamura | |
| 7,613,242 B2 | 11/2009 | Bykovnikov | |
| 7,616,704 B2 | 11/2009 | Li et al. | |
| 7,668,253 B2 | 2/2010 | Hwang et al. | |
| 7,733,940 B2 | 6/2010 | Dooley et al. | |
| 7,738,571 B2 | 6/2010 | Costa et al. | |
| 7,756,002 B2 | 7/2010 | Batra et al. | |
| 7,830,995 B2 | 11/2010 | Ojard | |
| 7,876,845 B2 | 1/2011 | Karabinis | |
| 7,949,032 B1 | 5/2011 | Frost | |
| 7,970,345 B2 | 6/2011 | Cummiskey et al. | |
| 7,974,176 B2 | 7/2011 | Zheng | |
| 8,050,337 B2 | 11/2011 | Karabinis | |
| 8,185,931 B1 * | 5/2012 | Reeves | 726/1 |
| 8,233,554 B2 | 7/2012 | Karabinis | |
| 2001/0048538 A1 | 12/2001 | Kowalski | |
| 2001/0050926 A1 | 12/2001 | Kumar | |
| 2002/0065099 A1 | 5/2002 | Bjorndahl | |
| 2002/0122499 A1 | 9/2002 | Kannan et al. | |
| 2002/0150109 A1 | 10/2002 | Agee | |
| 2002/0159533 A1 | 10/2002 | Crawford | |
| 2002/0196765 A1 | 12/2002 | Tulino | |
| 2003/0107513 A1 | 6/2003 | Abraham et al. | |
| 2003/0161385 A1 | 8/2003 | Chang et al. | |
| 2003/0228017 A1 | 12/2003 | Beadle et al. | |
| 2004/0005013 A1 | 1/2004 | Nunally et al. | |
| 2004/0039524 A1 | 2/2004 | Adachi | |
| 2004/0080315 A1 | 4/2004 | Beevor et al. | |
| 2004/0086027 A1 | 5/2004 | Shattil | |
| 2004/0095907 A1 | 5/2004 | Agee et al. | |
| 2004/0132417 A1 | 7/2004 | Maeda et al. | |
| 2004/0151109 A1 | 8/2004 | Batra et al. | |
| 2004/0170430 A1 | 9/2004 | Gorokhov | |
| 2004/0252853 A1 | 12/2004 | Blamey et al. | |
| 2005/0013238 A1 | 1/2005 | Hansen | |
| 2005/0128938 A1 | 6/2005 | Fang et al. | |
| 2005/0207385 A1 | 9/2005 | Gorokhov et al. | |
| 2005/0243938 A1 | 11/2005 | Armstrong et al. | |
| 2005/0255878 A1 | 11/2005 | Leinonen et al. | |
| 2005/0281321 A1 | 12/2005 | Bergstrom et al. | |
| 2006/0009209 A1 | 1/2006 | Rieser et al. | |
| 2006/0045196 A1 | 3/2006 | Reid | |
| 2006/0062320 A1 | 3/2006 | Luz et al. | |
| 2006/0062391 A1 * | 3/2006 | Lee et al. | 380/270 |
| 2006/0084444 A1 | 4/2006 | Kossi et al. | |
| 2006/0088187 A1 | 4/2006 | Clarkson et al. | |
| 2006/0165100 A1 | 7/2006 | Huang et al. | |
| 2006/0171445 A1 | 8/2006 | Batra et al. | |
| 2006/0178124 A1 | 8/2006 | Sugar | |
| 2006/0227889 A1 | 10/2006 | Uchida et al. | |
| 2006/0233147 A1 | 10/2006 | Karabinis | |
| 2006/0239334 A1 | 10/2006 | Kwon et al. | |
| 2007/0004465 A1 | 1/2007 | Papasakellariou et al. | |
| 2007/0015460 A1 | 1/2007 | Karabinis et al. | |
| 2007/0032890 A1 | 2/2007 | Zhou et al. | |
| 2007/0041311 A1 | 2/2007 | Baum et al. | |
| 2007/0053449 A1 | 3/2007 | Adachi | |
| 2007/0177680 A1 | 8/2007 | Green et al. | |
| 2007/0211786 A1 | 9/2007 | Shattil | |
| 2007/0216488 A1 | 9/2007 | Kultgen | |
| 2007/0248194 A1 | 10/2007 | Lu | |
| 2007/0271606 A1 | 11/2007 | Amann et al. | |
| 2007/0281693 A1 | 12/2007 | Ballentin et al. | |
| 2007/0285308 A1 | 12/2007 | Bauregger et al. | |
| 2008/0019341 A1 | 1/2008 | Perlman | |
| 2008/0167003 A1 * | 7/2008 | Wang et al. | 455/411 |
| 2008/0187066 A1 * | 8/2008 | Wang et al. | 375/267 |
| 2008/0215888 A1 * | 9/2008 | Barriga et al. | 713/176 |
| 2008/0229108 A1 * | 9/2008 | Chase-Salerno et al. | 713/172 |
| 2008/0304605 A1 | 12/2008 | Aziz et al. | |
| 2009/0092041 A1 | 4/2009 | Juang | |
| 2009/0110033 A1 | 4/2009 | Shattil | |
| 2009/0168730 A1 | 7/2009 | Baum et al. | |
| 2009/0168844 A1 | 7/2009 | Larsson | |
| 2009/0252257 A1 | 10/2009 | Sadowsky et al. | |
| 2009/0279422 A1 | 11/2009 | Fonseka et al. | |
| 2009/0282472 A1 * | 11/2009 | Hamilton et al. | 726/15 |
| 2010/0002789 A1 | 1/2010 | Karabinis | |
| 2010/0024042 A1 * | 1/2010 | Motahari et al. | 726/26 |
| 2010/0121617 A1 | 5/2010 | Gruener et al. | |
| 2011/0080877 A1 * | 4/2011 | Nentwig | 370/329 |
| 2011/0123028 A1 | 5/2011 | Karabinis | |
| 2011/0219423 A1 * | 9/2011 | Aad et al. | 726/1 |
| 2011/0222495 A1 | 9/2011 | Li et al. | |
| 2011/0228989 A1 * | 9/2011 | Burton | 382/116 |
| 2012/0039379 A1 | 2/2012 | Husen et al. | |

FOREIGN PATENT DOCUMENTS

| | | |
|---|---|---|
| EP | 1 589 712 A2 | 10/2005 |
| WO | WO 2005/036790 A1 | 4/2005 |
| WO | WO 2007/001707 A2 | 1/2007 |

OTHER PUBLICATIONS

3GPP/LTE Advanced, "3$^{rd}$ Generation Partnership Project: Technical Specification Group Radio Access Network; Evolved Universal Terrestrial Radio Access (E-UTRA); Physical channels and modulation (Release 10)", 3GPP TS 36.211, V10.0.0, Dec. 2010, 103 pp.

Agilent Technologies, "Introducing LTE-Advanced", Application Note, Retrieved from the Internet at URL: http://cp.literature.agilent.com/litweb/pdf/5990-6706EN.pdf, Printed in USA, Mar. 8, 2011, 36 pages.

Benvenuto et al., "On the Comparison Between OFDM and Single Carrier Modulation With a DFE Using a Frequency-Domain Feedforward Filter", *IEEE Transactions on Communications*, vol. 50, No. 6, Jun. 2002, pp. 947-955.

Brüninghaus et al., "Multi-Carrier Spread Spectrum and Its Relationship to Single Carrier Transmission", *48$^{th}$ IEEE Vehicular Technology Conference*, Ottawa, Ontario, vol. 3, May 18-21, 1998, pp. 2329-2332.

Carroll "Chaotic communications that are difficult to detect" *Physical Review E* 67(2):26207-1-26207-6 (2003).

(56) References Cited

OTHER PUBLICATIONS

Charalabopoulos et al. "Pre- post- and balanced equalization in OFDM", Vehicular Technology Conference, 2003. VTC 2003-Fall. 2003 IEEE 58$^{th}$ Orlando, FL, USA; Oct. 6-9, 2003; Piscataway, NJ USA, IEEE, US, vol. 5, Oct. 6, 2003, pp. 3145-3148.
Dahlman E. et al. "3G Evolution HSPA and LTE for Mobile Broadband", 2008, Elsevier Ltd., Oxford US, pp. 383-387.
Dahlman E. et al., *3G Evolution: HSPA and LTE for Mobile Broadband—2d Edition*, (Burlington, MA: Academic Press, 2008), Chapter 4, pp. 43-64.
Dahlman, "3G long-term evolution", Telefon AB LM Ericsson, 2005, 36 pp.
Dinis et al., "A Multiple Access Scheme for the Uplink of Broadband Wireless Systems", *IEEE Global Telecommunications Conference*, Nov. 29-Dec. 3, 2004, vol. 6, pp. 3808-3812.
Dollard P.M. "On the time-bandwidth concentration of signal functions forming given geometric vector configurations", *IEEE Transactions on Information Theory*, Oct. 1964, pp. 328-338.
Ekström et al., "Technical Solutions for the 3G Long-Term Evolution", *IEEE Communications Magazine*, vol. 44, No. 3, Mar. 2006, pp. 38-45.
Falconer et al., "Frequency Domain Equalization for Single-Carrier Broadband Wireless Systems", *IEEE Communications Magazine*, vol. 40, No. 4, Apr. 2002, pp. 58-66.
Galda et al., "A Low Complexity Transmitter Structure for OFDM-FDMA Uplink Systems" *IEEE 55$^{th}$ Vehicular Technology Conference*, 2002, vol. 4, May 2002, pp. 1737-1741.
Gardner "Signal Interception: A Unifying Theoretical Framework for Feature Detection" *IEEE Transactions on Communications* 36(8):897-906 (1988).
Gessner et al., "LTD technology and LTE test; a deskside chat", Rohde & Schwarz, Apr. 2009, 92 pp.
Haykin, S., *Adaptive Filter Theory*, 1986, Prentice-Hall, pp. 173,301,497.
Holma et al. "LTE for UMTS—OFDMA and SC-FDMA Based Radio Access" 2009, John Wiley & Sons, Ltd., Chichester UK, pp. 76-82.
International Preliminary Report on Patentability, PCT International Application No. PCT/US09/01152, Nov. 8, 2010.
International Search Report and Written Opinion, PCT International Application No. PCT/US2009/003495, Nov. 26, 2009.
Invitation to Pay Additional Fees corresponding to International Application No. PCT/US2010/029028; Date of Mailing: Jan. 28, 2011; 11 pages.
Ishii, "Draft2 Report of 3GPP TSG RAN WG1 #40bis in Beijing (Beijing, China, Apr. 4-8, 2005)", R1-050376, Agenda Item 3, 3GPP TSG RAN WG1 Meeting #41, Athens, Greece, May 9-13, 2005, 65 pp.
Ixia "SC-FDMA Single Carrier FDMA in LTE" White Paper, Rev. A, Nov. 2009, 16 pp.
Jungnickel V. et al., "Synchronization of Cooperative Base Stations", *IEEE International Symposium on Wireless Communications Systems*; Oct. 21-24, 2008, 6 pages.
Karabinis "*Increased Capacity Communications for OFDM-Based Wireless Communications Systems/Methods/Devices*", U.S. Appl. No. 12/748,931, filed Mar. 29, 2010.
Landau H.J. & Pollak H.O., "Prolate spheroidal wave functions, Fourier analysis and uncertainty—III: The dimension of the space of essentially time- and band-limited signals", *Bell System Technical Journal*, 41, pp. 1295-1336, Jul. 1962.
Lim et al., "Channel-Dependent Scheduling of Uplink Single Carrier FDMA Systems" *IEEE 64$^{th}$ Vehicular Technology Conference*, Montreal, Quebec, Sep. 25-28, 2006, pp. 1-5.
Mietzner et al. "Multiple-antenna techniques for wireless communications—a comprehensive literature survey", IEEE Communications Surveys, IEEE, New York, NY, US; vol. 11, No. 2, Apr. 1, 2009, pp. 87-105.
Motorola, "R1-050971 Single Carrier Uplink Options for E-UTRA: IFDMA/DFT-SOFDM Discussion and Initial Performance Results",
3GPP TSG RAN WG1 #42, London, United Kingdom, Agenda Item: 10.3, Aug. 29-Sep. 2, 2005, 30 pp.
Motorola, "Uplink Numerology and Frame Structure", 3GPP TSG RAN1#41 Meeting, Athens, Greece, Agenda Item 13.2, May 9-13, 2005, 10 pp.
Myung et al., "Single Carrier FDMA for Uplink Wireless Transmission", *IEEE Vehicular Technology Magazine*, Sep. 2006, pp. 30-38.
Nedic, Slobodan et al. "Per-Bin DFE for Advanced OQAM-based Multi-Carrier Wireless Data Transmission Systems." *2002 International Zurich Seminar on Broadband Communications Access—Transmission—Networking*. (2002): 38-1-38-6. Print.
Nokia, "Uplink Considerations for Utran LTE", 3GPP TSG RAN WG1 #40bis, Beijing, China, R1-050251, Agenda Item 12.2.1, Apr. 4-8, 2005, 8 pp.
Notification of Transmittal of the International Search Report and the Written Opinion of the International Searching Authority, or the Declaration, International Search Report, Written Opinion of the International Searching Authority, PCT Application No. PCT/US2009/001152, May 7, 2009.
Price R. et al., "A Communication Technique for Multipath Channels", *Proceedings of the IRE*, 1958, vol. 46, pp. 555-570.
Proakis, John G. *Digital Communications*, 1983, McGraw-Hill, pp. 479.
Rumney, "3GPP LTE: Introducing Single-Carrier FDMA", *Agilent Measurement Journal*, Jan. 1, 2008, 10 pp.
Sari et al., "Transmission Techniques for Digital Terrestrial TV Broadcasting", *IEEE Communications Magazine*, vol. 33, No. 2, Feb. 1995, pp. 100-109.
Schilling D.L. et al., "Optimization of the Processing Gain on an M-ary Direct Sequence Spread Spectrum communication System", *IEEE Transactions on Communications*, vol. Com-28, No. 8, Aug. 1980, pp. 1389-1398.
Song et al. "Cross-Layer Optimization for OFDM Wireless Networks—Part II: Algorithm Development", *IEEE Transactions on Wireless Communications*, vol. 4, No. 2, Mar. 2005, pp. 625-634.
Sorger et al., "Interleaved FDMA—A New Spread-Spectrum Multiple-Access Scheme", *IEEE International Conference on Communications*, vol. 2, Jun. 7-11, 1998, pp. 1013-1017.
Tran, Thien-Toan et al., "Overview of enabling technologies for 3GPP LTE-advanced", *EURASIP Journal on Wireless Communications and Networking*, 2012, vol. 54, 12 Pages.
U.S. Appl. No. 60/692,932, filed Jun. 22, 2005, Peter D. Karabinis, "Communications systems, methods, devices and computer program products for low probability of intercept (PLI), low probability of detection (LPD) and/or low probability of exploitation (LPE) of communications information".
U.S. Appl. No. 60/698,247, filed Jul. 11, 2005, Peter D. Karabinis, "Additional communications systems, methods, devices and/or computer program products for low probability of intercept (PLI), low probability of detection (LPD) and/or low probability of exploitation (LPE) of communications information and/or minimum interference communications".
U.S. Appl. No. 61/033,114, filed Mar. 3, 2008, Peter D. Karabinis, "Next Generation (Xg) Chipless Spread-Spectrum Communications (Cssc)".
Widrow B., Stearns S.D., *Adaptive Signal Processing*, 1985, Prentice-Hall, Inc., pp. 183.
Wikipedia contributors, "Orthogonal frequency-division multiplexing," *Wikipedia, The Free Encyclopedia*, http://en.wikipedia.org/w/index.php?title=Orthogonal_frequency-division_multiplexing &oldid=489673844 (accessed Apr. 25, 2012).
Zhang et al., "A Novel Direct Waveform Synthesis Technique With Carrier Frequency Programmable", *IEEE Wireless Communications and Networking Conference*, 2002, pp. 150-154.
Zhang H. et al., "Base Station Cooperation for Multiuser MIMO: Joint Transmission and BS Selection", *2004 Conference on Information Sciences and Systems, Princeton University*, Mar. 17-19, 2004, 6 pages.
Akan et al. "ATL: An Adaptive Transport Layer Suite for Next-Generation Wireless Internet", *IEEE Journal on Selected Areas in Communications*, vol. 22, No. 5, Jun. 2004, 802-817.

(56) References Cited

OTHER PUBLICATIONS

Akyildiz et al. "AdaptNet: An Adaptive Protocol Suite for the Next-Generation Wireless Internet", *IEEE Communications Magazine*, Mar. 2004, 128-136.

Akyildiz et al. "Wireless mesh networks: a survey", *Computer Networks*, vol. 47 (4), 2005, 445-487.

Brodersen et al. "CORVUS: A Cognitive Radio Approach for Usage of Virtual Unlicensed Spectrum", *Berkeley Wireless Research Center (BWRC)*, White Paper, 2004, 21 pp.

Buddhikot et al. "DIMSUMNet: New Directions in Wireless Networking Using Coordinated Dynamic Spectrum Access", *Proceedings of the Sixth IEEE International Symposium on a World of Wireless Mobile and Multimedia Networks (WoWMoM '05)*, 2005, 8 pp.

Cabric et al. "A Cognitive Radio Approach for Usage of Virtual Unlicensed Spectrum", *Proceedings of the 14th IST Mobile and Wireless Communications Summit*, Jun. 2005, 5 pp.

Cabric et al. "Implementation Issues in Spectrum Sensing for Cognitive Radios", *Proc. 38th Asilomar Conference on Signals*, Systems and Computers, Nov. 2004, 772-776.

DARPA XG Working Group, "The XG Architectural Framework, Request for Comments, V1.0", Prepared by BBN Technologies, Cambridge, MA, US, Jul. 2003, 16 pp.

DARPA XG Working Group, "The XG Vision, Request for Comments, V2.0", Prepared by BBN Technologies, Cambridge MA, US, Jan. 2004, 17 pp.

Digham et al. "On the Energy Detection of Unknown Signals over Fading Channels", *Proc. IEEE ICC 2003*, vol. 5, May 2003, 3575-3579.

Esteves "The High Data Rate Evolution of the cdma2000 Cellular System", *Appeared in Multiaccess, Mobility and Teletraffic for Wireless Communications*, vol. 5, Kluwer Academic Publishers, 2000, pp. 61-72.

Federal Communications Commission, FCC 03-289, ET Docket No. 03-237, Notice of Inquiry and Notice of Proposed Rulemaking, Nov. 2003, 31 pp.

Federal Communications Commission, FCC 03-322, ET Docket No. 03-108, Notice of Proposed Rule Making and Order, Dec. 2003, 53 pp.

Grandblaise et al. "Dynamic Spectrum Allocation (DSA) and Reconfigurability", *Proceeding of the SDR 02 Technical Conference and Product Exposition*, Nov. 2002, 6 pp.

Haykin "Cognitive Radio: Brain-Empowered Wireless Communications", *IEEE Journal on Selected Areas in Communications*, vol. 23, No. 2, Feb. 2005, 201-220.

Hillenbrand et al. "Calculation of Detection and False Alarm Probabilities in Spectrum Pooling Systems", *IEEE Communications Letters*, vol. 9, No. 4, Apr. 2005, 349-351.

Horne "Adaptive Spectrum Access: Using the Full Spectrum Space", *Proc. Telecommunications Policy Research Conference (TPRC)*, Sep. 2003, 15 pp.

Hoven et al., "Some Fundamental Limits on Cognitive Radio", PowerPoint presentation, Wireless Foundations, EECS, University of California at Berkeley, Feb. 11, 2005, 16 pp.

Jondral "Software-Defined Radio-Basics and Evolution to Cognitive Radio", *EURASIP Journal on Wireless Communications and Networking*, 2005:3, 275-283.

Kanodia et al. "MOAR: A Multi-channel Opportunistic Auto-rate Media Access Protocol for Ad Hoc Networks", *Proceedings of the First International Conference on Broadband Networks (BROADNETS '04)*, Oct. 2004, 600-610.

Leaves et al. "Dynamic Spectrum Allocation in Composite Reconfigurable Wireless Networks", *IEEE Communications Magazine*, vol. 42, May 2004, 72-81.

Mitola III "Cognitive Radio for Flexible Mobile Multimedia Communications", *IEEE International Workshop on Mobile Multimedia Communications (MoMuC)*, Nov. 1999, 3-10.

Mitola III et al. "Cognitive Radio: Making Software Radios More Personal", *IEEE Personal Communications*, vol. 6, Issue 4, Aug. 1999, 13-18.

Mitola III, Dissertation "Cognitive Radio—An Integrated Agent Architecture of Software Defined Radio", Royal Institute of Technology, May 8, 2000, 313 pp.

Murty R. "Software-defined reconfigurability radios: smart, agile, cognitive, and interoperable", downloaded Nov. 12, 2013 from http://www.siliconinvestor.com/readmsg.aspx?msgid-19066134, 4 pp.

Sahai et al. "Some Fundamental Limits on Cognitive Radio", *Allerton Conf. on Commun., Control and Computing*, 2004, Oct. 2004, 11 pp.

Weiss et al. "Efficient Signaling of Spectral Resources in Spectrum Pooling Systems", *Proceedings of the 10th Symposium on Communications and Vehicular Technology (SCVT)*, Nov. 2003, 6 pp.

Weiss et al. "Spectrum Pooling: An Innovative Strategy for the Enhancement of Spectrum Efficiency", *IEEE Radio Communications Magazine*, 2004, 8-14.

Xu et al. "DRiVE-ing to the Internet: Dynamic Radio for IP Services in Vehicular Environments", *Proceedings of the 25th Annual IEEE Conference on Local Computer Networks*, Nov. 2000, 281-289.

Zheng et al. "Collaboration and Fairness in Opportunistic Spectrum Access", *Proceedings IEEE ICC 2005*, vol. 5, May 2005, 3132-3136.

\* cited by examiner

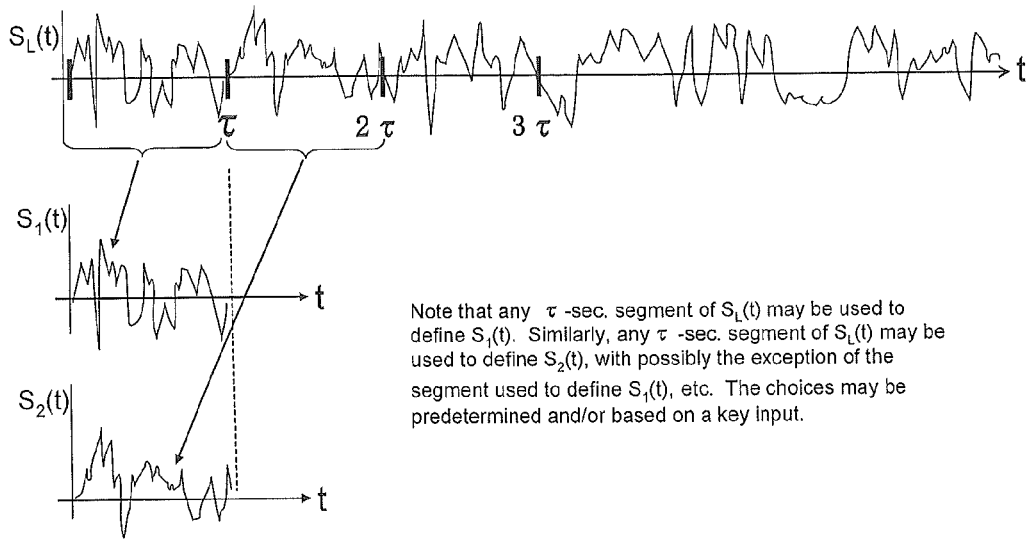

Note that any $\tau$-sec. segment of $S_L(t)$ may be used to define $S_1(t)$. Similarly, any $\tau$-sec. segment of $S_L(t)$ may be used to define $S_2(t)$, with possibly the exception of the segment used to define $S_1(t)$, etc. The choices may be predetermined and/or based on a key input.

Figure 3

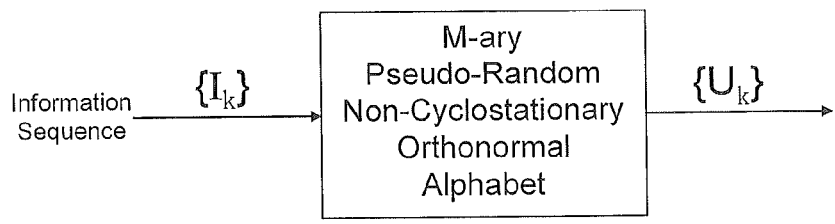

$I_k \in \{I_1, I_2, \ldots I_M\}$ for $\forall k$ $U_k \in \{U_1, U_2, \ldots, U_M\}$ $\{I_k\} = \sum_k I_k \delta(t - k\tau)$ or $\{I_k\} = \sum I_k \delta(t - \underset{\uparrow}{\tau}_k)$ Random variable

Figure 4

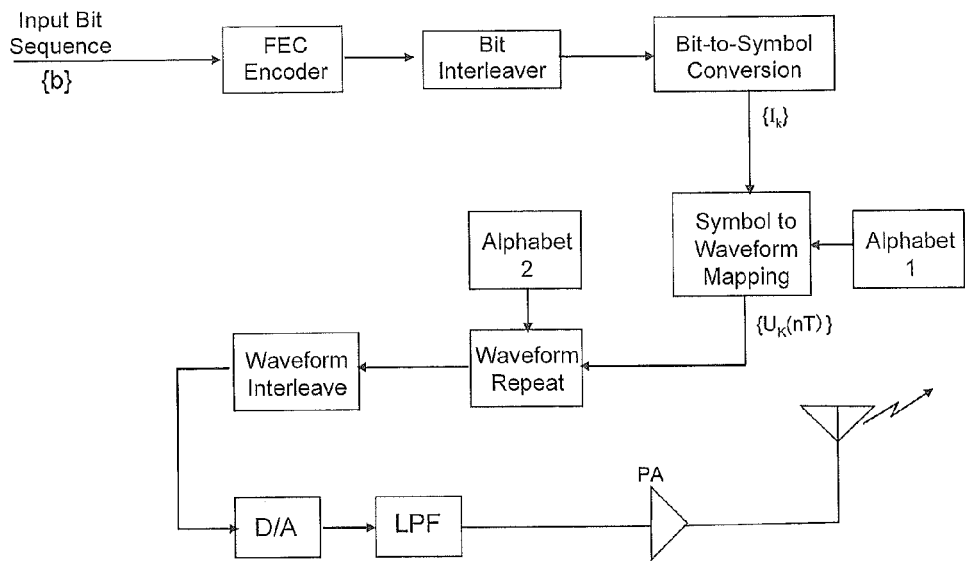
Figure 7
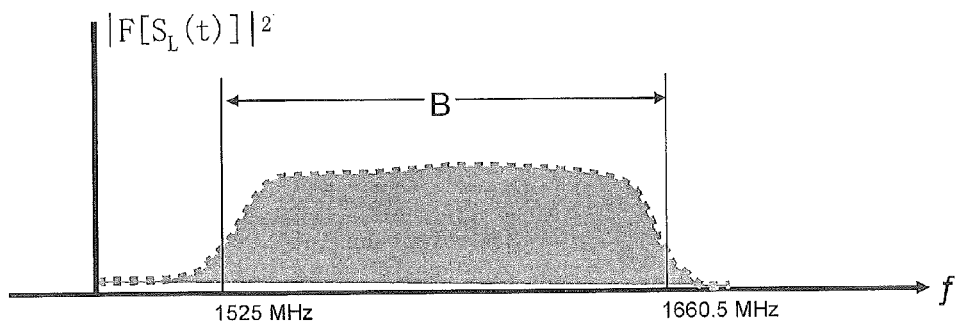
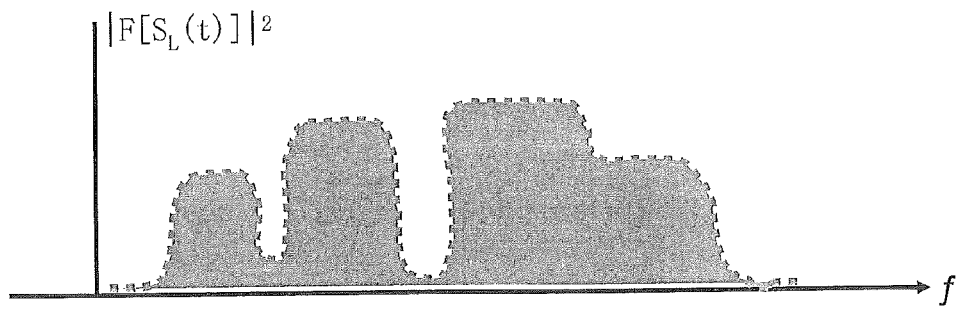
Figure 8

SYSTEMS/METHODS OF ADAPTIVELY VARYING A BANDWIDTH AND/OR FREQUENCY CONTENT OF COMMUNICATIONS

CLAIM FOR PRIORITY

This application is a continuation of U.S. patent application Ser. No. 13/780,480, filed Feb. 28, 2013, entitled "Systems/Methods of Adaptively Varying a Bandwidth and/or Frequency Content of Communications", which itself is a continuation of U.S. patent application Ser. No. 13/011,451, filed Jan. 21, 2011, entitled Systems and/or Methods of Increased Privacy Wireless Communications, which itself is a continuation-in-part of U.S. patent application Ser. No. 12/372,354, filed Feb. 17, 2009, entitled Wireless Communications Systems and/or Methods Providing Low Interference, High Privacy and/or Cognitive Flexibility, now U.S. Pat. No. 7,876,845, which itself claims priority to U.S. Provisional Application No. 61/033,114, filed Mar. 3, 2008, entitled Next Generation (XG) Chipless Spread-Spectrum Communications (CSSC), and is a continuation-in-part (CIP) of U.S. application Ser. No. 11/720,115, filed May 24, 2007, entitled Systems, Methods, Devices and/or Computer Program Products For Providing Communications Devoid of Cyclostationary Features, now U.S. Pat. No. 8,050,337, which itself is a 35 U.S.C. §371 national stage application of PCT Application No. PCT/US2006/020417, filed on May 25, 2006, which claims priority to U.S. Provisional Patent Application No. 60/692,932, filed Jun. 22, 2005, entitled Communications Systems, Methods, Devices and Computer Program Products for Low Probability of Intercept (LPI), Low Probability of Detection (LPD) and/or Low Probability of Exploitation (LPE) of Communications Information, and also claims priority to U.S. Provisional Patent Application No. 60/698,247, filed Jul. 11, 2005, entitled Additional Communications Systems, Methods, Devices and Computer Program Products for Low Probability of Intercept (LPI), Low Probability of Detection (LPD) and/or Low Probability of Exploitation (LPE) of Communications Information and/or Minimum Interference Communications, the entirety of all of which are incorporated herein by reference. The above-referenced PCT International Application was published in the English language as International Publication No. WO 2007/001707.

FIELD

This invention relates to communications systems and methods, and more specifically to wireless communications systems and methods.

BACKGROUND

Wireless communications systems and methods are increasingly being used to provide voice, data and/or multimedia services. As the use of these systems/methods continues to increase, available bandwidths may limit the ability of such systems/methods to transmit voice/data/multimedia content effectively unless the available bandwidths are utilized intelligibly and with agility.

SUMMARY

A bandwidth that is allocated to a transmitted waveform need not be contiguous in frequency space and a frequency content of the transmitted waveform may vary, as needed, even on a signaling interval by signaling interval basis, in order to accommodate a desired transfer rate, reduce or avoid interference and/or enhance an end user experience. According to embodiments of the invention, a set of frequencies that is used to provide frequency content to elements of a waveform alphabet, used to form the transmitted waveform, is varied thus varying a frequency content of the transmitted waveform. A time span associated with the elements of the waveform alphabet may also be varied. Some embodiments comprise first and second frequency intervals that are used to provide frequency content to elements of the waveform alphabet; wherein the first and second frequency intervals are non-contiguous therebetween and wherein a third frequency interval that is between the first and second frequency intervals remains devoid of providing frequency content to the waveform alphabet in order to reduce or avoid interference. Various transmitter/receiver embodiments are disclosed including direct synthesis transmitter/receiver embodiments.

BRIEF DESCRIPTION OF THE DRAWINGS

FIG. 3 is a schematic illustration of waveform generation according to additional embodiments of the present invention.

FIG. 4 is a schematic illustration of further functions of a transmitter according to further embodiments of the present invention.

FIG. 7 is a schematic illustration of further functions of a transmitter according to further embodiments of the present invention.

FIG. 8 is a schematic illustration of spectrum used by a transmitter according to embodiments of the present invention.

DETAILED DESCRIPTION

Figure 1:
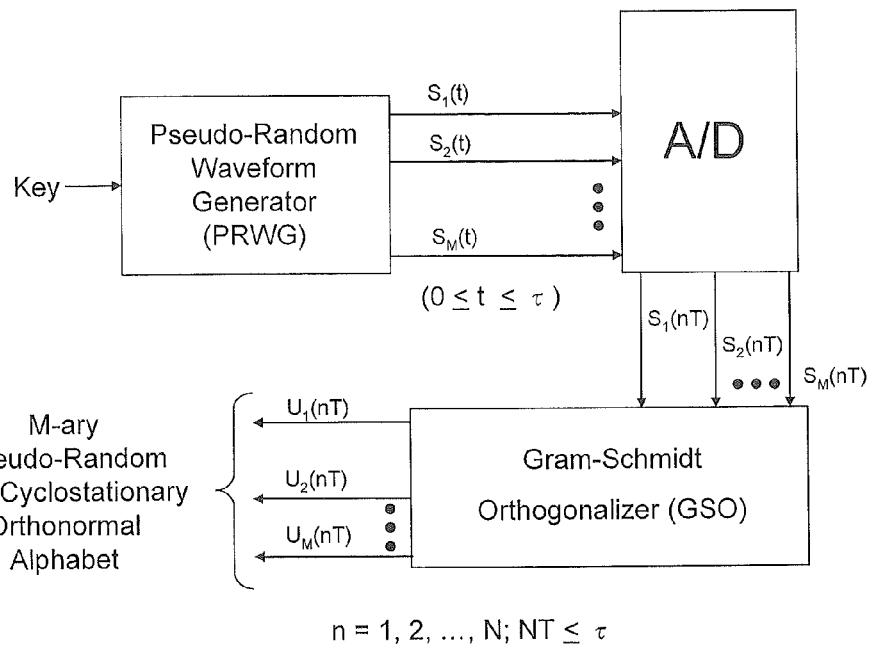
FIG. 1 is a schematic illustration of functions of a transmitter according to embodiments of the present invention.

A wireless communications system configured for Low Probability of Intercept (LPI), Low Probability of Detection (LPD) and/or Low Probability of Exploitation (LPE) communications may use waveforms substantially void of a cyclostationary signature to improve a LPI/LPD/LPE property. It is known that, in general, a set of M independent "seed" waveforms that satisfy a time-bandwidth constraint may be used via a Gram-Schmidt Orthogonalization (GSO) procedure to generate M orthonormal functions. In accordance with exemplary embodiments of the present invention, the M seed waveforms may, for example, be chosen from a band-limited Gaussian-distributed process (such as, for example, Gaussian-distributed pseudo-random noise) and may be used to generate, via an orthogonalization operation, such as, for example, a GSO, a corresponding set of M Gaussian-distributed orthonormal functions substantially void of a cyclostationary property. The set of M Gaussian-distributed orthonormal functions may be used in a communications system to define a signaling alphabet of a transmitter of the communications system (and a corresponding matched filter bank of a receiver of the communications system) to thereby reduce or eliminate a cyclostationary signature of a transmitted communications waveform and thus increase a covertness measure of the communications system. The set of M Gaussian-distributed orthonormal functions may be updated, modified and/or changed as often as necessary to further increase and/or maximize a covertness measure of the communications system. A receiver of the communications system may be equipped with substantially the same algorithm(s) that are used by the transmitter of the communications system and the receiver may be substantially synchronized with the transmitter to thereby re-create and use at the receiver the M Gaussian-distributed orthonormal functions for detection of communications information. The set of M orthonormal functions may, in some embodiments, be a set of orthogonal but not necessarily orthonormal functions. In further embodiments, the set of M orthonormal functions may be non-Gaussian distributed and may be, for example, uniformly distributed, Rayleigh distributed and/or distributed in accordance with any other known (continuous and/or discrete) and/or arbitrary distribution. In still further embodiments of the invention, different functions/elements of an M-ary orthonormal and/or orthogonal signaling alphabet may be differently distributed.

Known systems and/or methods of LPI/LPD/LPE and/or Jam Resistant (JR) Burst Communications (BURSTCOMM) may combine, in general, hybrid spread-spectrum waveforms comprising Frequency-Hopping (FH), Direct Sequence Pseudo-Noise (DSPN) spreading and/or Time-Hopping (TH) to increase covertness and/or resistance to jamming. Transmitting a FH/DSPN spread-spectrum waveform in pseudo-random short bursts using, for example, a TH technique, may, for example, reduce an interceptor's ability to integrate sufficient energy to trigger a delectability threshold associated with a radiometer that the interceptor may be using as a means of signal detection/identification. It is known that a radiometric approach to signal detection/identification may yield a suboptimum and/or unsatisfactory performance measure when attempting to detect/identify/exploit a FH/DSPN/TH spread-spectrum communications signal in a changing noise and/or interference environment. An analysis by Gardner, however, has shown that a cyclic feature of a communications waveform may advantageously be exploited by an interceptor even when a radiometric-based method fails to detect the communications waveform due to a background noise/interference level and/or a signal energy reaching the interceptor's receiver being insufficient over the interceptor's radiometric integration time (see W. A. Gardner, "*Signal Interception: A Unifying Theoretical Framework for Feature Detection*," IEEE Transactions on Communications, Vol. 36, No. 8, August 1988). It is, therefore, desirable to be able to communicate information using waveforms that do not substantially include a cyclostationary signature in order to further reduce the probability of intercept/detection/exploitation of a communications system/waveform that is intended for LPI/LPD/LPE communications.

There are at least two potential advantages associated with signal detection, identification, interception and/or exploitation based on cyclic spectral analysis compared with the energy detection (radiometric) method: (1) A cyclic signal feature (i.e., chip rate and/or symbol rate) may be discretely distributed even if a signal has continuous distribution in a power spectrum. This implies that signals that may have overlapping and/or interfering features in a power spectrum may have a non-overlapping and distinguishable feature in terms of a cyclic characteristic. (2) A cyclic signal feature associated with a signal's cyclostationary property, may be identified via a "cyclic periodogram." The cyclic periodogram of a signal is a quantity that may be evaluated from time-domain samples of the signal, a frequency-domain mapping such as, for example, a Fast Fourier Transform (FFT), and/or discrete autocorrelation operations. Since very large point FFTs and/or autocorrelation operations may be implemented using Very Large Scale Integration (VLSI) technologies, Digital Signal Processors (DSPs) and/or other modern technologies, a receiver of an interceptor may be configured to perform signal Detection, Identification, Interception and/or Exploitation (D/I/I/E) based on cyclic feature detection processing.

Given the potential limitation(s) of the radiometric approach and the potential advantage(s) of cyclic feature detection technique(s) it is reasonable to expect that a sophisticated interceptor may be equipped with a receiver based on cyclic feature detection processing. It is, therefore, of potential interest and potential importance to develop communications systems capable of communicating information void of cyclostationary properties/signatures to thereby render cyclic feature detection processing by an interceptor substantially ineffective.

FIG. 1 illustrates embodiments of generating a communications alphabet comprising M distinct pseudo-random, non-cyclostationary, orthogonal and/or orthonormal waveforms. As illustrated in FIG. 1, responsive to a "key" input (such as, for example, a TRANsmissions SECurity (TRANSEC), a COMMunications SECurity (COMMSEC) and/or any other key input), a Pseudo-Random Waveform Generator (PRWG) may be used to generate a set of M distinct pseudo-random waveforms, which may, according to some embodiments of the invention, represent M ensemble elements of a Gaussian-distributed random process. The M distinct pseudo-random waveforms (e.g., the M ensemble elements) may be denoted as $\{S(t)\}=\{S_1(t), S_2(t), \ldots, S_M(t)\}; 0 \le t \le \tau$. The set of waveforms $\{S(t)\}$ may be a band-limited set of waveforms having a one-sided bandwidth less than or equal to B Hz. As such, a number of distinct orthogonal and/or orthonormal waveforms that may be generated from the set $\{S(t)\}$ may, in accordance with established Theorems, be upper-bounded by C$\tau$B, where C$\ge$2 (see, for example, P. M. Dollard, "*On the time-bandwidth concentration of signal functions forming given geometric vector configurations*," IEEE Transactions on Information Theory, IT-10, pp. 328-338, October 1964; also see H. J. Landau and H. O. Pollak, "*Prolate spheroidal wave functions, Fourier analysis and uncertainty—III. The dimension of the space of essentially time-and band-limited signals*," BSTJ, 41, pp. 1295-1336, July 1962).

Figure 2:
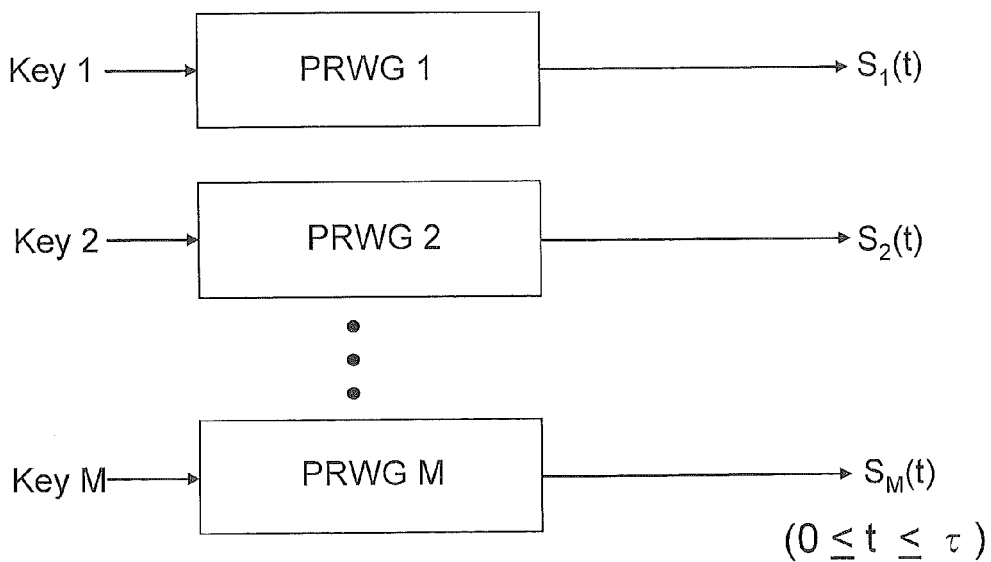
FIG. 2 is a schematic illustration of further functions of a transmitter according to further embodiments of the present invention.

In accordance with some embodiments of the present invention, the $j^{th}$ element of the set of waveforms $\{S(t)\}$, $S_j(t)$; $j=1, 2, \ldots, M$; may be generated by a respective $j^{th}$ PRWG in response to a respective $j^{th}$ key input, as illustrated in FIG. 2. In some embodiments according to FIG. 2, each of the PRWG is the same PRWG and each key differs relative to each other key. In other embodiments, each key is the same key and each PRWG differs relative to each other PRWG. In further embodiments of FIG. 2, each key differs relative to each other key and each PRWG also differs relative to each other PRWG. Other combinations and subcombinations of these embodiments may be provided. In still other embodiments, a single PRWG and a single key may be used to generate a "long" waveform $S_L(t)$ which may be segmented into M overlapping and/or non-overlapping components to form a set of waveforms $\{S(t)\}$, as illustrated in FIG. 3. In some embodiments, a new set of waveforms $\{S(t)\}$ may be formed periodically, non-periodically, periodically over certain periods of time and/or periodically but with a jitter imposed on a periodicity interval, responsive one or more Time-of-Day (TOD) value(s), as may, for example, be derived from processing of Global Positioning System (GPS) signals, and/or following the transmission of a measure of at least one of the elements of $\{S(t)\}$. In some embodiments, a processor may be operatively configured as a background operation, generating new sets of waveforms $\{S(t)\}$, and storing the new sets of waveforms $\{S(t)\}$ in memory to be accessed and used as needed. In further embodiments, a used set of waveforms $\{S(t)\}$ may be discarded and not used again, whereas in other embodiments, a used set of waveforms $\{S(t)\}$ may be placed in memory to be used again at a later time. In some embodiments, some sets of waveforms $\{S(t)\}$ are used once and then discarded, other sets of waveforms $\{S(t)\}$ are not used at all, and still other sets of waveforms $\{S(t)\}$ are used more than once. Finally, in some embodiments, the waveform duration τ and/or the waveform bandwidth B may vary between at least two sets of waveforms and/or between two elements of a given set of waveforms.

Still referring to FIG. 1, the set of substantially continuous-time waveforms $\{S(t)\}=\{S_1(t), S_2(t), \ldots, S_M(t)\}$; $0 \leq t \leq \tau$; may be transformed from a substantially continuous-time representation to a substantially discrete-time representation using, for example, one or more Analog-to-Digital (A/D) converters and/or one or more Sample-and-Hold (S/H) circuits, to generate a corresponding substantially discrete-time set of waveforms $\{S(nT)\}=\{S_1(nT), S_2(nT), \ldots, S_M(nT)\}$; $n=1, 2, \ldots, N$; $nT \leq \tau$. A Gram-Schmidt orthogonalizer and/or orthonormalizer and/or any other orthogonalizer and/or orthonormalizer, may then be used, as illustrated in FIG. 1, to generate a set of waveforms $\{U(nT)\}=\{U_1(nT), U_2(nT), \ldots, U_M(nT)\}$; $n=1, 2, \ldots, N$; $nT \leq \tau$ that are orthogonal and/or orthonormal to one another. The GSO and/or other orthogonalization and/or orthonormalization procedure(s) are known to those skilled in the art and need not be described further herein (see, for example, Simon Haykin, "*Adaptive Filter Theory*," at 173, 301, 497; 1986 by Prentice-Hall; and Bernard Widrow and Samuel D. Stearns "*Adaptive Signal Processing*," at 183; 1985 by Prentice-Hall, Inc.). It will be understood that the sampling interval T may be chosen in accordance with Nyquist sampling theory to thereby preserve by the discrete-time waveforms $\{S(nT)\}$ substantially all of the information contained in the continuous-time waveforms $\{S(t)\}$. It will also be understood that, in some embodiments of the invention, the sampling interval T may be allowed to vary over the duration τ of one waveform, between different waveforms of a given set of waveforms and/or between different sets of waveforms. Furthermore, the waveform duration τ may be allowed to vary, in some embodiments, between different waveforms of a given set of waveforms and/or between different sets of waveforms.

The set $\{U(nT)\}=\{U_1(nT), U_2(nT), \ldots, U_M(nT)\}$; $n=1, 2, N \leq \tau$, NT may be used, in some embodiments of the present invention, to define an M-ary pseudo-random and non-cyclostationary alphabet. As illustrated in FIG. 4, an information symbol $I_k$, occurring at a discrete time k (for example, at $t=k\tau$ or, more generally, if the discrete time epochs/intervals are variable, at $t=\tau_k$), and having one of M possible information values, $\{I_1, I_2, \ldots, I_M\}$, may be mapped onto one of the M waveforms of the M-ary alphabet $\{U_1(nT), U_2(nT), \ldots, U_M(nT)\}$; $n=1, 2, N$; $NT \leq \tau$. For example, in some embodiments, if $I_k=I_2$, then during the $k^{th}$ signaling interval the waveform $U_2(nT)$ may be transmitted; $n=1, 2, N$; $NT \leq \tau$. It will be understood that transmitting the waveform $U_2(nT)$ comprises transmitting substantially all of the elements (samples) of the waveform $U_2(nT)$ wherein substantially all of the elements (samples) of the waveform $U_2(nT)$ means transmitting $U_2(T)$, $U_2(2T), \ldots,$ and $U_2(NT)$. Furthermore, it will be understood that any unambiguous mapping between the M possible information values of $I_k$ and the M distinct waveforms of the M-ary alphabet, $\{U_1(nT), U_2(nT), \ldots, U_M(nT)\}$, may be used to communicate information to a receiver (destination) provided that the receiver also has knowledge of the mapping. It will also be appreciated that the ordering or indexing of the alphabet elements and the unambiguous mapping between the M possible information values of $I_k$ and the M distinct waveforms of the M-ary alphabet may be arbitrary, as long as both transmitter (source) and receiver (destination) have knowledge of the ordering and mapping.

In some embodiments of the invention, the information symbol $I_k$, may be constrained to only two possible values (binary system). In such embodiments of the invention, the M-ary alphabet may be a binary (M=2) alphabet comprising only two elements, such as, for example, $\{U_1(nT), U_2(nT)\}$. In other embodiments of the invention, while an information symbol, $I_k$, is allowed to take on one of M distinct values (M≥2) the alphabet comprises more than M distinct orthogonal/orthonormal waveforms $\{U_1(nT), U_2(nT), \ldots, U_L(nT)\}$; L>M to thereby increase a distance between a set of M alphabet elements that are chosen and used to communicate information and thus allow an improvement of a communications performance measure such as, for example, an error rate, a propagations distance and/or a transmitted power level. It will be understood that in some embodiments, the number of distinct values that may be made available to an information symbol to thereby allow the information symbol to communicate one or more bits of information, may be reduced or increased responsive to a channel state such as, for example an attenuation, a propagation distance and/or an interference level. In further embodiments, the number of distinct elements comprising the orthogonal/orthonormal alphabet may also change responsive to a channel state. In some embodiments, as a number of information symbol states (values) decreases, a number of distinct elements comprising the orthogonal/orthonormal alphabet increases.

Figure 5:
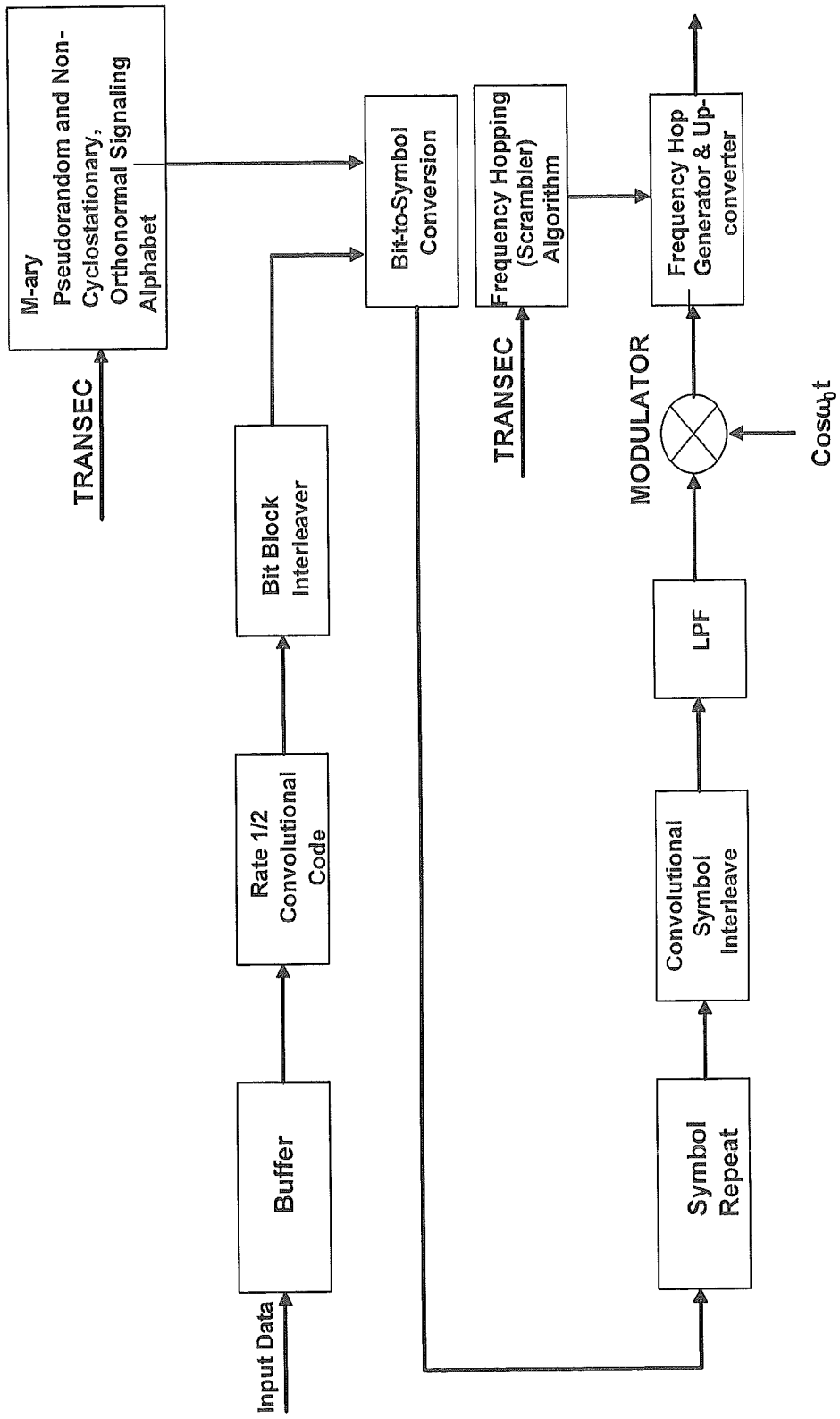
FIG. 5 is a schematic illustration of additional functions of a transmitter according to additional embodiments of the present invention.

It will be understood that at least some conventional transmitter functions comprising, for example, Forward Error Correction (FEC) encoding, interleaving, data repetition, filtering, amplification, modulation, frequency translation, scrambling, frequency hopping, etc., although not shown in FIGS. 1 through 4, may also be used in some embodiments of the present invention to define an overall transmitter chain. At least some of these conventional transmitter functions may be used, in some embodiments, in combination with at least some of the signal processing functions of FIGS. 1 through 4, to specify an overall transmitter signal processing chain. For example, an information bit sequence may be FEC encoded using, for example, a convolutional encoder, interleaved and/or bit-to-symbol converted to define a sequence of information symbols, $\{I_k\}$. The sequence of information symbols, $\{I_k\}$, may then be mapped onto a waveform sequence $\{U_k\}$, as illustrated in FIG. 4. At least some, and in some embodiments all, of the elements of the waveform sequence $\{U_k\}$ may then be repeated, at least once, to increase a redundancy measure, interleaved, filtered, frequency translated, amplified and/or frequency-hopped, for example, (not necessarily in that order) prior to being radiated by an antenna of the transmitter. An exemplary embodiment of a transmitter comprising conventional signal functions in combination with at least some of the signal processing functions of FIGS. 1 through 4, to specify an overall transmitter signal processing chain, is illustrated in FIG. 5.

Figure 6:
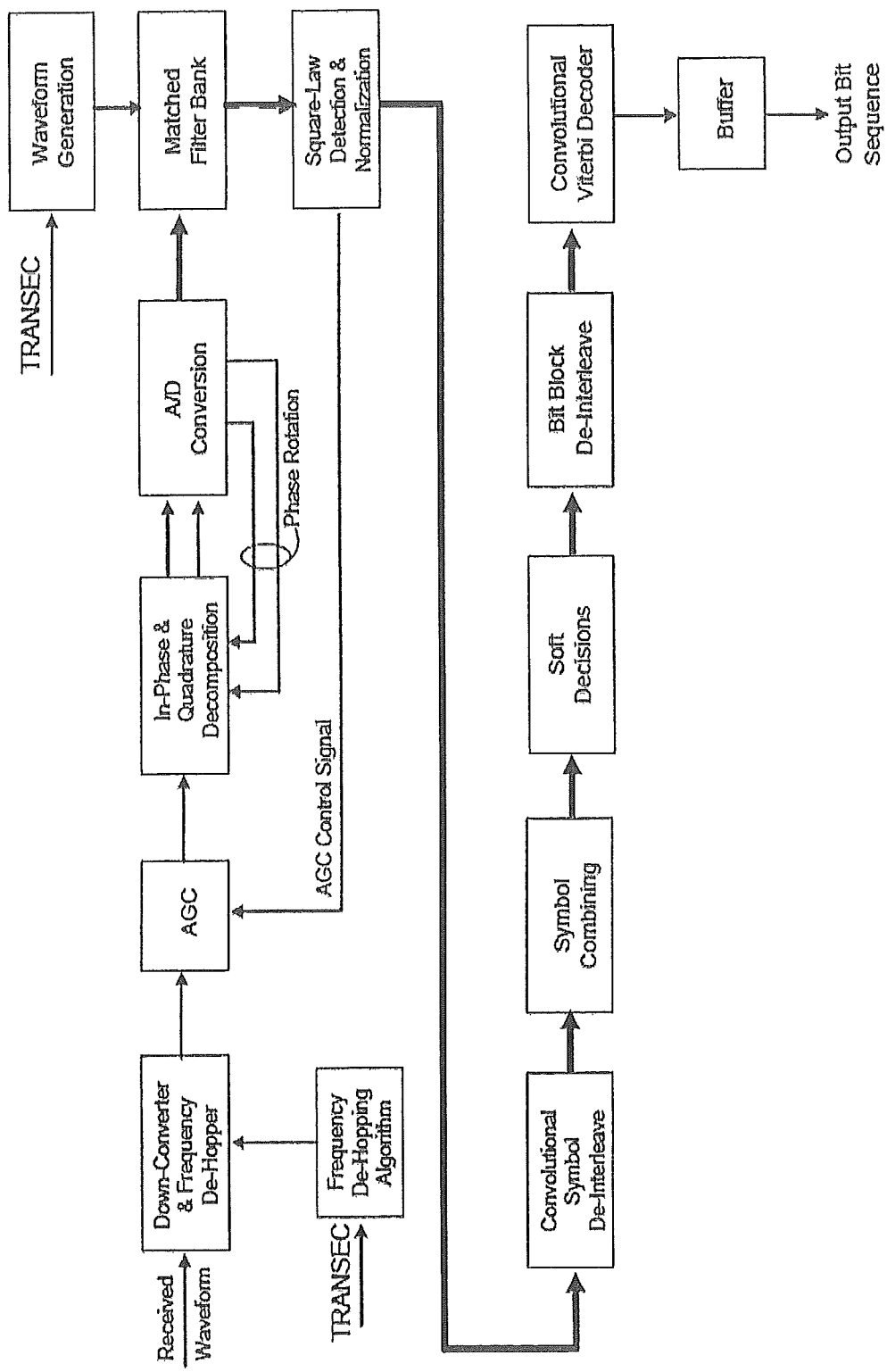
FIG. 6 is a schematic illustration of functions of a receiver according to embodiments of the present invention.

A receiver (destination) that is configured to receive communications information from a transmitter (source) comprising functions of FIGS. 1 through 4, may advantageously be equipped with sufficient information to generate a matched filter bank corresponding (and responsive) to the M-ary alphabet $\{U_1(nT), U_2(nT), \ldots, U_M(nT)\}$ of FIG. 4. Such a receiver may be substantially synchronized with one or more transmitters using, for example, GPS signal processing. Substantial relative synchronism between a receiver and at least one transmitter may be used and/or may be essential in order to reliably generate and/or update at the receiver the M-ary alphabet functions $\{U_1(nT), U_2(nT), \ldots, U_M(nT)\}$ and/or the matched filter bank in coordination with one or more transmitters (responsively to TOD and/or key values) to thereby provide the receiver with substantial optimum reception capability. In some embodiments of the invention, all transmitters and receivers are substantially synchronized using GPS signal processing. It will be understood that a receiver may be provided with the appropriate key sequence(s) (e.g., TRANSEC) and the appropriate signal processing algorithms to thereby responsively form and/or update the M-ary alphabet functions and/or the matched filter bank. It will also be understood that a receiver may also be configured with an inverse of conventional transmitter functions that may be used by a transmitter. For example, if, in some embodiments, a transmitter is configured with scrambling, interleaving of data and frequency hopping, then a receiver may be configured with the inverse operations of de-scrambling, de-interleaving of data and frequency de-hopping. An exemplary embodiment of a receiver, which may correspond to the exemplary transmitter embodiment of FIG. 5, is illustrated in FIG. 6.

FIG. 7 illustrates elements of a communications transmitter according to further embodiments of the invention. As shown in FIG. 7, following conventional operations of Forward Error Correction (FEC) encoding, bit interleaving and bit-to-symbol conversion (performed on an input bit sequence $\{b\}$ to thereby form an information symbol sequence $\{I_k\}$), the information symbol sequence $\{I_k\}$ is mapped onto a non-cyclostationary waveform sequence $\{U_k(nT)\}$ using a first M-ary non-cyclostationary orthonormal alphabet (Alphabet 1). An element of $\{U_k(nT)\}$ may then be repeated (at least once), as illustrated in FIG. 7, using a second M-ary non-cyclostationary orthonormal alphabet (Alphabet 2), interleaved, transformed to the continuous-time domain representation, filtered, amplified (not necessarily in that order) and transmitted. The repeat of an element of $\{U_k(nT)\}$ may be performed using a different alphabet (Alphabet 2) in order to reduce or eliminate a cyclostationary feature/signature in the transmitted waveform. For at least the same reason, the at least two alphabets of FIG. 7 may be replaced by new alphabets following the transmission of a predetermined number of waveform symbols. In some embodiments, the predetermined number of waveform symbols is one. As stated earlier, a large reservoir of alphabets may be available and new alphabet choices may be made following the transmission of the predetermined number of waveform symbols and/or at predetermined TOD values.

According to some embodiments of the invention, the M-ary non-cyclostationary orthonormal alphabet waveforms may be broadband waveforms as illustrated in FIG. 8.

FIG. 8 illustrates a power spectral density of a broadband waveform defining the M-ary non-cyclostationary orthonormal alphabet (such as, for example, waveform $S_L(t)$ of FIG. 3), over frequencies of, for example, an L-band (e.g., from about 1525 MHz to about 1660.5 MHz). However, FIG. 8 is for illustrative purposes only and the power spectral density of $S_L(t)$ and/or any other set of waveforms used to define the M-ary non-cyclostationary orthonormal alphabet may be chosen to exist over any other frequency range and/or interval(s). In some embodiments, different alphabets may be defined over different frequency ranges/intervals (this feature may provide intrinsic frequency hopping capability). As is further illustrated in FIG. 8 (second trace), certain frequency intervals that warrant protection (or additional protection) from interference, such as, for example, a GPS frequency interval, may be substantially excluded from providing frequency content for the generation of the M-ary non-cyclostationary orthonormal alphabets. It will be appreciated that the transmitter embodiment of FIG. 7 illustrates a "direct synthesis" transmitter in that the transmitter directly synthesizes a transmitted waveform, without resorting to up-conversion and/or carrier modulation. This aspect may further enhance the LPI/LPD/LPE feature(s) of a communications system.

Figure 9:
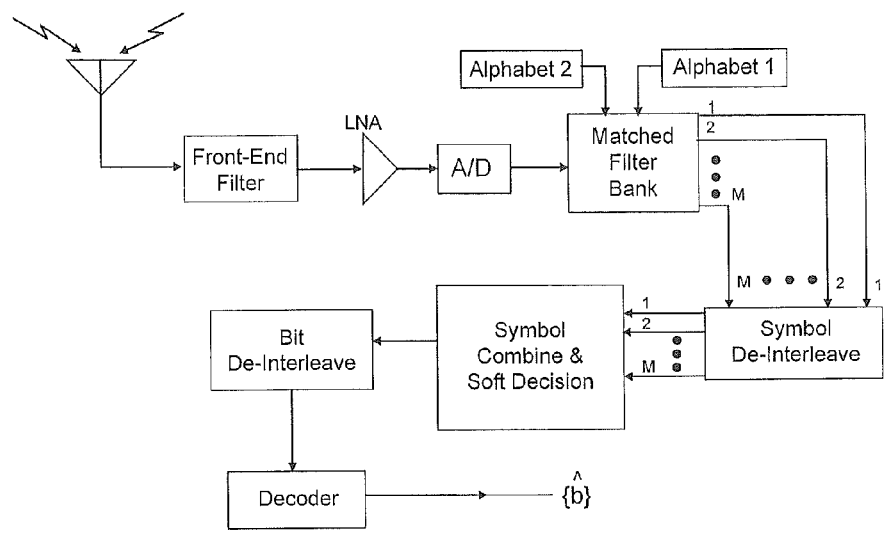
FIG. 9 is a schematic illustration of further functions of a receiver according to further embodiments of the present invention.

A receiver (destination) that is configured to receive communications information from a transmitter (source) comprising the functionality of FIG. 7, may be provided with sufficient information to generate a matched filter bank corresponding to the transmitter waveform set of the M-ary alphabet $\{U_1(nT), U_2(nT), \ldots, U_M(nT)\}$. Such a receiver may be substantially synchronized with the transmitter using GPS-derived TOD. FIG. 9 illustrates elements of such a receiver, according to exemplary embodiments of the present invention. As illustrated in FIG. 9, following front-end filtering, amplification and Analog-to-Digital and/or discrete-time (A/D) conversion of a received waveform, a matched-filter bank, comprising matched filters reflecting the TOD-dependent waveform alphabets used by the transmitter, is used for detection of information. The receiver may have information regarding what waveform alphabet the transmitter may have used as a function of TOD. As such, the receiver, operating in substantial TOD synchronism with the transmitter, may know to configure the matched-filter bank with the appropriate (TOD-dependent) matched filter components to thereby achieve optimum or near optimum signal detection. Following matched-filter detection, symbol de-interleaving and symbol repeat combination, soft decisions of a received symbol sequence may be made, followed by bit de-interleaving and bit decoding, to thereby generate an estimate of a transmitted information bit sequence.

In accordance with some embodiments of the invention, a receiver architecture, such as, for example, the receiver architecture illustrated in FIG. 9, may further configure a matched filter bank to include a "rake" matched filter architecture, to thereby resolve multipath components and increase or maximize a desired received signal energy subject to multipath fading channels. Owing to the broadband nature of the communications alphabets, in accordance with some embodiments of the invention, a significant number of multipath components may be resolvable. Rake matched filter architectures are known to those skilled in the art and need not be described further herein (see, for example, John G. Proakis, "*Digital Communications*," McGraw-Hill, 1983, section 7.5 starting at 479; also see R. Price and P. E. Green Jr. "*A

*Communication Technique for Multipath Channels,*" Proc. IRE, Vol. 46, pp. 555-570, March 1958).

Figure 10:
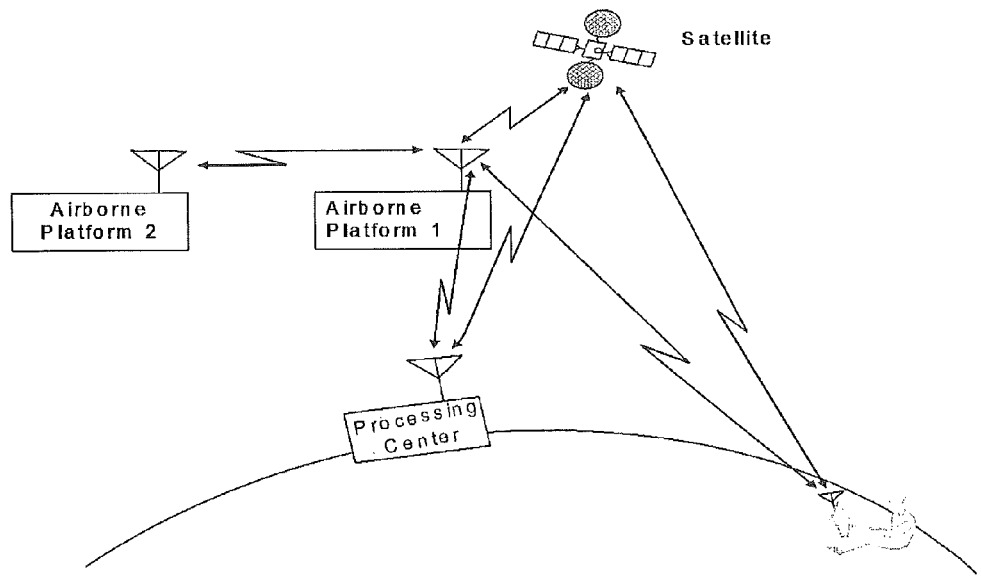
FIG. 10 is a schematic illustration of a communications system based upon one or more transmitters and one or more receivers according to further embodiments of the present invention.
Figure 11:
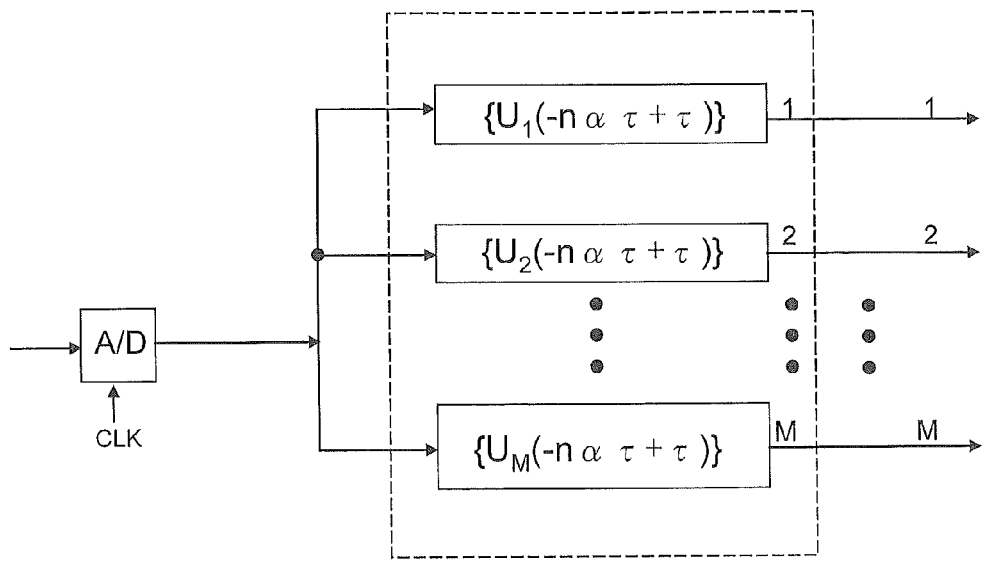
FIGS. 11 through 14 illustrate functions of a receiver according to further embodiments of the present invention.
Figure 12:
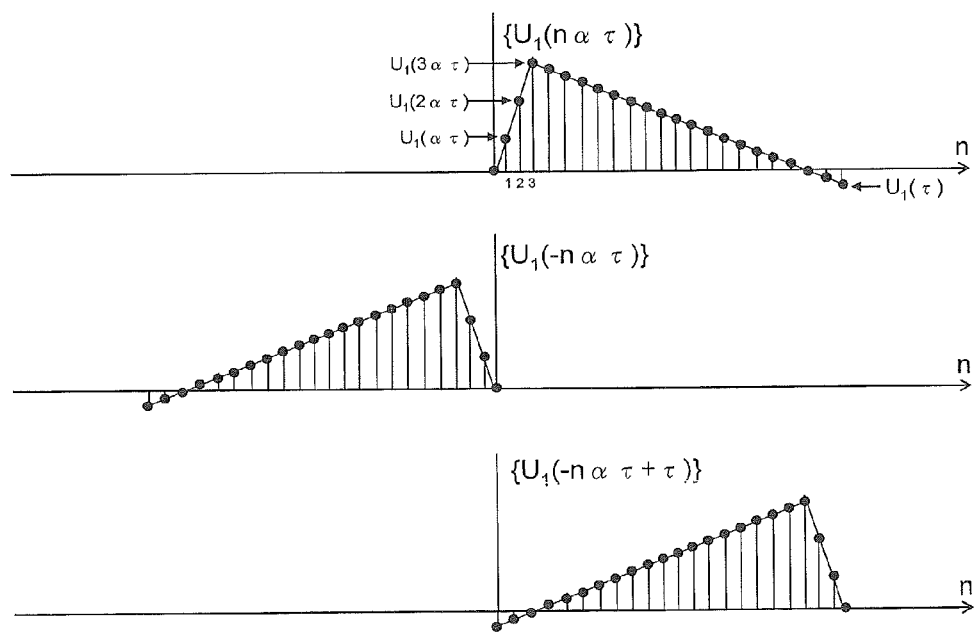
Figure 13:
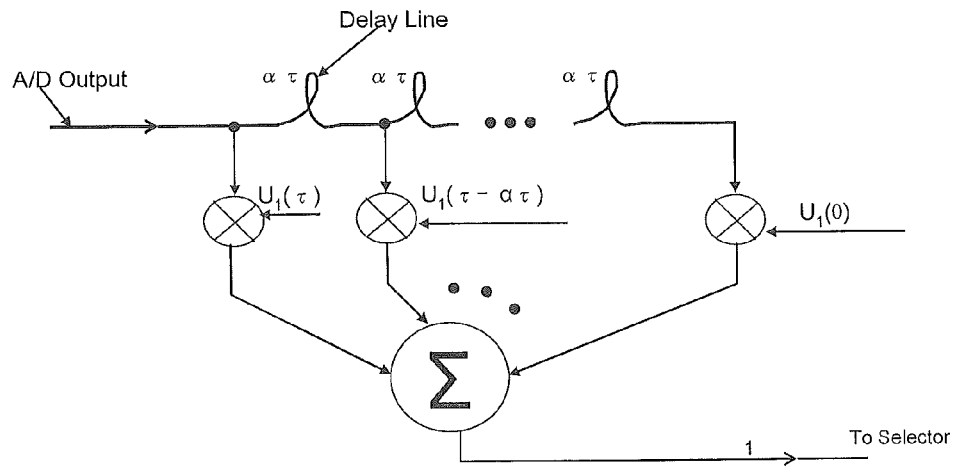
Figure 14:
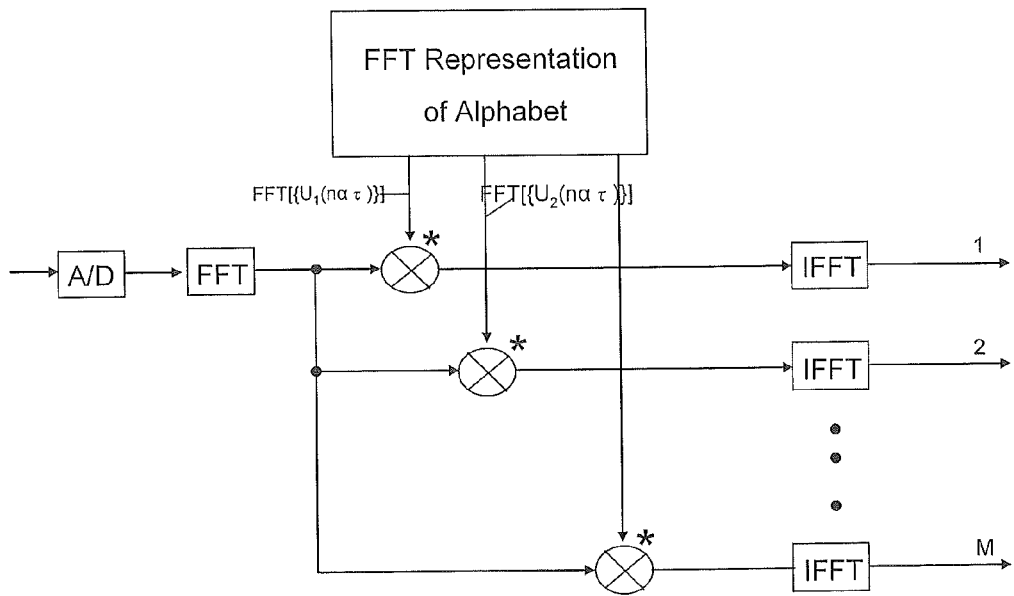

FIG. 10 illustrates an operational scenario relating to a covert communications system, in accordance with some embodiments of the invention, wherein air-to-ground, air-to-air, air-to-satellite and/or satellite-to-ground communications may be conducted. Ground-to-ground communications (not illustrated in FIG. 10) may also be conducted. Modes of communications may be, for example, point-to-point and/or point-to-multipoint. A network topology that is predetermined and/or configured in an ad hoc fashion, in accordance with principles known to those skilled in the art, may be used to establish communications in accordance with any of the embodiments of the invention and/or combinations thereof.

Figure 15:
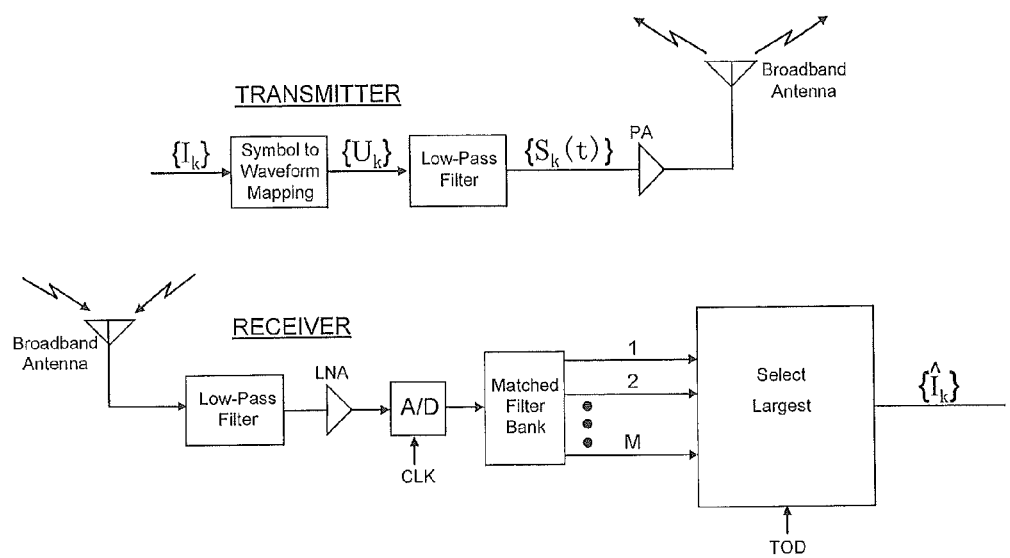
FIG. 15 is a schematic illustration of further functions of a transmitter and receiver according to further embodiments of the present invention.

FIGS. 11 through 14 illustrate elements relating to a matched filter and/or a matched filter bank in accordance with exemplary embodiments of the invention, as will be appreciated by those skilled in the art. FIG. 15 further illustrates elements of a transmitter/receiver combination in accordance with some embodiments of the invention.

In some embodiments of the invention, a transmitter may be configured to selectively radiate a pseudo-random noise waveform (that may be substantially void of information) and may, for example, be Gaussian distributed, occupying a bandwidth that is substantially the same as a bandwidth occupied by a communications waveform. The transmitter may be configured to selectively radiate the pseudo-random noise waveform during periods of time during which no communications information is being transmitted. This may be used, in some embodiments, to create a substantially constant/invariant ambient/background noise floor, that is substantially independent of whether or not communications information is being transmitted, to thereby further mask an onset of communications information transmission.

It will be understood by those skilled in the art that communications systems, waveforms and/or principles described herein may also find applications in systems wherein covertness may not be a primary concern. Communications systems, waveforms and/or principles described herein may, for example, be used to provide short-range wireless communications (that may be broadband short-range wireless communications) in, for example, a home, office, conference and/or business environment while reducing and/or minimizing a level of interference to one or more other communications services that may be using the same, partially the same and/or near-by frequencies as the short-range communications system. Other applications of communications systems, waveforms and/or principles described herein will also occur to those skilled in the art, including, for example, radar applications and/or cellular telecommunications applications. In a cellular telecommunications application, for example, a cellular telecommunications system, in accordance with communications waveform principles described herein, may be configured, for example, as an overlay to one or more conventional cellular/PCS systems and/or one or more other systems, using the frequencies of one or more licensed and/or unlicensed bands (that may also be used by the one or more conventional cellular/PCS systems and/or the one or more other systems) to communicate with user equipment using broadband and/or Ultra Wide-Band (UWB) waveforms. The broadband and/or UWB waveforms may be non-cyclostationary and/or Gaussian-distributed, in accordance with the teachings of the present invention, to thereby reduce and/or minimize a level of interference to the one or more conventional cellular/PCS systems and/or to the one or more other systems by the overlay cellular telecommunications system and thereby allow the overlay cellular telecommunications system to reuse the available spectrum (which is also used by the one or more conventional cellular/PCS systems and/or the one or more other systems) to provide communications services to users. According to some embodiments of a cellular telecommunications application, a cellular telecommunications system that is configured to communicate with user devices using communications waveforms in accordance with the transmitter, receiver and/or waveform principles described herein, is an overlay to one or more conventional cellular/PCS systems and/or to one or more other systems and is using the frequencies of one or more licensed and/or unlicensed bands (also being used by the one or more conventional cellular/PCS systems and/or the one or more other systems) and may be configured to communicate with the user devices preferentially using frequencies of the one or more licensed and/or unlicensed bands that are locally not used substantially and/or are locally used substantially as guardbands and/or transition bands by the one or more conventional cellular/PCS systems and/or the one or more other systems, to thereby further reduce a level of interference between the cellular telecommunications system and the one or more conventional cellular/PCS systems and/or the one or more other systems. As used herein, the terms "locally not used substantially" and/or "locally used substantially as guardbands and/or transition bands" refer to a local service area of a base station and/or group of base stations and/or access point(s) of the cellular telecommunications system. In such a service area, the cellular telecommunications system may, for example, be configured to identify frequencies that are "locally not used substantially" and/or frequencies that are "locally used substantially as guardbands and/or transition bands" by the one or more conventional cellular/PCS systems and/or the one or more other systems and preferentially use the identified frequencies to communicate bidirectionally and/or unidirectionally with user equipment thereby further reducing or minimizing a measure of interference.

Specific exemplary embodiments of the invention have been described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. As used herein, the term "and/or" includes any and all combinations of one or more of the associated listed items. The symbol "/" is also used as a shorthand notation for "and/or".

The present invention was described above with reference to block diagrams of methods, apparatus (systems), components and/or computer program products according to embodiments of the invention. It is understood that a given block of the block diagrams, and combinations of blocks in the block diagrams may be implemented by computer program instructions. These computer program instructions may be provided to a processor of a general purpose computer, special purpose computer, such as a digital signal processor, and/or other programmable data processing apparatus to produce a machine, such that the instructions, which execute via the processor of the computer and/or other programmable data processing apparatus, create means for implementing the functions/acts specified in the block diagrams block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagram block or blocks.

In the specification and the Figures thereof, there have been disclosed embodiments of the invention, and although specific terms are employed, they are used in a generic and descriptive sense only and not for purposes of limitation; the scope of the invention being set forth in the following claims.

What is claimed is:

1. A method of conveying information using a transceiver that includes a wireless transmitter and a wireless receiver; wherein the wireless transmitter comprises a transmit antenna, a power amplifier, a digital-to-analog converter, an encoder, a transmit filter, a transmit waveform alphabet and a transmit processor; and wherein the wireless receiver comprises a receive antenna, a receive filter, a low noise amplifier, an analog-to-digital converter, a decoder, a correlator, a receive processor and a receive waveform alphabet; the method comprising:
   processing by the transmit processor an input bit sequence $\{b\}$ to thereby form an information symbol sequence $\{I_k\}$ that is to be transmitted; wherein k denotes discrete time;
   mapping by the transmit processor the information symbol sequence $\{I_k\}$ that is to be transmitted into a baseband waveform sequence $\{U_k(nT)\}$ by using first and second waveform elements of the transmit waveform alphabet that differ therebetween in spectral content in that respective first and second bandwidths thereof differ therebetween and/or respective first and second frequency ranges thereof differ therebetween; wherein for each value of k, n takes on a plurality of values and T>0;
   varying by the transmit processor a spectral content of the baseband waveform sequence $\{U_k(nT)\}$, without resorting to conventional chipping with a binary waveform, by using the first and second waveform elements of the transmit waveform alphabet that differ therebetween in spectral content and by basing respective first and second waveform symbols of the baseband waveform sequence $\{U_k(nT)\}$ on said first and second waveform elements of the transmit waveform alphabet that differ therebetween in spectral content;
   encoding by the encoder elements of the baseband waveform sequence $\{U_k(nT)\}$;
   filtering by the transmit filter the baseband waveform sequence $\{U_k(nT)\}$;
   converting by the digital-to-analog converter the baseband waveform sequence $\{U_k(nT)\}$ from a discrete time representation to a continuous time representation;
   amplifying by the power amplifier the baseband waveform sequence $\{U_k(nT)\}$;
   radiating by the transmit antenna the baseband waveform sequence $\{U_k(nT)\}$;
   receiving by the receive antenna a waveform sequence $\{U_j(iT)\}$ that includes first and second waveform symbols that differ therebetween in spectral content in that respective first and second bandwidths thereof differ therebetween and/or respective first and second frequency ranges thereof differ therebetween; wherein j denotes discrete time and wherein for each value of j, i takes on a plurality of values;
   filtering by the receive filter the waveform sequence $\{U_j(iT)\}$;
   amplifying by the low noise amplifier the waveform sequence $\{U_j(iT)\}$;
   converting by the analog-to-digital converter the waveform sequence $\{U_j(iT)\}$ from a continuous time representation thereof to a discrete time representation thereof;
   correlating by the correlator the waveform sequence $\{U_j(iT)\}$ with a plurality of elements of the receive waveform alphabet that includes first and second waveform elements that differ therebetween in spectral content in that respective first and second bandwidths thereof differ therebetween and/or respective first and second frequency ranges thereof differ therebetween;
   mapping by the receive processor the waveform sequence $\{U_j(iT)\}$ into a receive information symbol sequence $\{I_j\}$; and
   forming an output bit sequence by decoding by the decoder the information symbol sequence $\{I_j\}$.

2. The method according to claim 1, wherein the transmit processor is further configured to distribute a frequency content of the baseband waveform sequence $\{U_k(nT)\}$ over first and second frequency intervals that are separated therebetween by a third frequency interval and to refrain from distributing the frequency content over the third frequency interval.

3. The method according to claim 1, wherein the transmit processor is further configured to vary a frequency range that is used to provide frequency content to the baseband waveform sequence $\{U_k(nT)\}$ such that third and fourth waveform symbols of the baseband waveform sequence $\{U_k(nT)\}$ are defined over respective third and fourth frequency ranges that differ therebetween.

4. The method according to claim 3, wherein the third and fourth frequency ranges that differ therebetween, are separated therebetween by a range of frequencies that is devoid of providing frequency content to the third and fourth waveform symbols.

5. The method according to claim 1, wherein for a first value of k, n=1, 2, ..., N; wherein for a second value of k, n=1, 2, ..., M; wherein the first and second values of k differ therebetween; and wherein N and M differ therebetween.

6. The method according to claim 5, wherein for the first value of k a duration of a respective first waveform symbol of the baseband waveform sequence $\{U_k(nT)\}$ comprises a first value NT and wherein for the second value of k the duration of a respective second waveform symbol of the baseband waveform sequence $\{U_k(nT)\}$ comprises a second value MT that differs from the first value NT.

7. The method according to claim 1, wherein first and second values of k comprise respective first and second successive integer values of k; and wherein respective first and second waveform symbols of the baseband waveform sequence $\{U_k(nT)\}$ corresponding to the first and second values of k differ therebetween in spectral content and are radiated by the transmit antenna over respective first and second successive transmission intervals that are adjacent therebetween and are separated therebetween by one transmit/receive symbol interval.

8. The method according to claim 1, wherein at least one of the first and second waveform elements that differ therebetween in spectral content comprises a waveform that is generated pseudo-randomly responsive to a predetermined statistical distribution.

9. The method according to claim 8, wherein the predetermined statistical distribution comprises a Gaussian distribution.

10. The method according to claim 1, wherein the baseband waveform sequence $\{U_k(nT)\}$ is devoid of a regularly repeating peak amplitude level while the wireless transmitter is conveying information.

11. The method according to claim 1, wherein the wireless transmitter/receiver is/are devoid of a modulator and/or frequency translator and is/are configured to convey information by transmitting/receiving the waveform sequence $\{U_k(nT)\}/\{U_j(iT)\}$ without subjecting the waveform sequence $\{U_k(nT)\}/\{U_j(iT)\}$ to a modulator and/or frequency translator.

12. The method according to claim 1, wherein the wireless transmitter/receiver comprise(s) a modulator and/or frequency translator and is/are configured to convey information by transmitting/receiving the waveform sequence $\{U_k(nT)\}/\{U_j(iT)\}$ and subjecting the waveform sequence $\{U_k(nT)\}/\{U_j(iT)\}$ to the modulator and/or frequency translator.

13. The method according to claim 1, wherein each one of the first and second waveform elements that differ therebetween in spectral content comprises a waveform that is generated pseudo-randomly and independently of the information symbol sequence $\{I_k\}$; and wherein the first and second waveform elements that differ therebetween in spectral content are statistically independent and orthogonal therebetween.

14. A method of conveying information using a wireless transmitter that includes a transmit antenna, a power amplifier, a digital-to-analog converter, an encoder, a transmit filter, a transmit waveform alphabet and a transmit processor; the method comprising:

processing by the transmit processor an input bit sequence $\{b\}$ to thereby form an information symbol sequence $\{I_k\}$ that is to be transmitted; wherein k denotes discrete time;

mapping by the transmit processor the information symbol sequence $\{I_k\}$ that is to be transmitted into a baseband waveform sequence $\{U_k(nT)\}$ by using first and second waveform elements of the transmit waveform alphabet that differ therebetween in spectral content in that respective first and second bandwidths thereof differ therebetween and/or respective first and second frequency ranges thereof differ therebetween; wherein for each value of k, n takes on a plurality of values and T>0;

varying by the transmit processor a spectral content of the baseband waveform sequence $\{U_k(nT)\}$, without resorting to conventional chipping with a binary waveform, by using the first and second waveform elements of the transmit waveform alphabet that differ therebetween in spectral content and by basing respective first and second waveform symbols of the baseband waveform sequence $\{U_k(nT)\}$ on said first and second waveform elements of the transmit waveform alphabet that differ therebetween in spectral content;

encoding by the encoder elements of the baseband waveform sequence $\{U_k(nT)\}$;

filtering by the transmit filter the baseband waveform sequence $\{U_k(nT)\}$;

converting by the digital-to-analog converter the baseband waveform sequence $\{U_k(nT)\}$ from a discrete time representation to a continuous time representation;

amplifying by the power amplifier the baseband waveform sequence $\{U_k(nT)\}$; and radiating by the transmit antenna the baseband waveform sequence $\{U_k(nT)\}$.

15. The method according to claim 14, wherein the transmit processor is further configured to distribute a frequency content of the baseband waveform sequence $\{U_k(nT)\}$ over first and second frequency intervals that are separated therebetween by a third frequency interval and to refrain from distributing the frequency content over the third frequency interval.

16. The method according to claim 14, wherein the transmit processor is further configured to vary a frequency range that is used to provide frequency content to the baseband waveform sequence $\{U_k(nT)\}$ such that third and fourth waveform symbols of the baseband waveform sequence $\{U_k(nT)\}$ are defined over respective third and fourth frequency ranges that differ therebetween.

17. The method according to claim 16, wherein the third and fourth frequency ranges that differ therebetween, are separated therebetween by a range of frequencies that is devoid of providing frequency content to the third and fourth waveform symbols.

18. The method according to claim 14, wherein for a first value of k, n=1, 2, ..., N; wherein for a second value of k, n=1, 2, ..., M; wherein the first and second values of k differ therebetween; and wherein N and M differ therebetween.

19. The method according to claim 18, wherein for the first value of k a duration of a respective first waveform symbol of the baseband waveform sequence $\{U_k(nT)\}$ comprises a first value NT and wherein for the second value of k the duration of a respective second waveform symbol of the baseband waveform sequence $\{U_k(nT)\}$ comprises a second value MT that differs from the first value NT.

20. The method according to claim 14, wherein first and second values of k comprise respective first and second successive integer values of k; and wherein respective first and second waveform symbols of the baseband waveform sequence $\{U_k(nT)\}$ corresponding to the first and second values of k differ therebetween in spectral content and are radiated by the transmit antenna over respective first and second successive transmission intervals that are adjacent therebetween and are separated therebetween by one transmit/receive symbol interval.

21. The method according to claim 14, wherein at least one of the first and second waveform elements that differ therebetween in spectral content comprises a waveform that is generated pseudo-randomly responsive to a predetermined statistical distribution.

22. The method according to claim 21, wherein the predetermined statistical distribution comprises a Gaussian distribution.

23. The method according to claim 14, wherein the baseband waveform sequence $\{U_k(nT)\}$ is devoid of a regularly repeating peak amplitude level while the wireless transmitter is conveying information.

24. The method according to claim 14, wherein the wireless transmitter is devoid of a modulator and/or frequency translator and is configured to convey information by transmitting the waveform sequence $\{U_k(nT)\}$ without subjecting the waveform sequence $\{U_k(nT)\}$ to a modulator and/or frequency translator.

25. The method according to claim 14, wherein the wireless transmitter comprises a modulator and/or frequency translator and is configured to convey information by transmitting the waveform sequence $\{U_k(nT)\}$ following having subjected the waveform sequence $\{U_k(nT)\}$ to the modulator and/or frequency translator.

26. The method according to claim 14, wherein each one of the first and second waveform elements that differ therebetween in spectral content comprises a waveform that is generated pseudo-randomly and independently of the information symbol sequence $\{I_k\}$; and wherein the first and second waveform elements that differ therebetween in spectral content are statistically independent and orthogonal therebetween.

27. A method of conveying information using a wireless receiver that includes a receive antenna, a receive filter, a low noise amplifier, an analog-to-digital converter, a decoder, a correlator, a receive processor and a receive waveform alphabet; the method comprising:

receiving by the receive antenna a waveform sequence $\{U_j(iT)\}$ that includes first and second waveform symbols that differ therebetween in spectral content in that respective first and second bandwidths thereof differ therebetween and/or respective first and second frequency ranges thereof differ therebetween; wherein j denotes discrete time and wherein for each value of j, i takes on a plurality of values and T>0;

filtering by the receive filter the waveform sequence $\{U_j(iT)\}$;

amplifying by the low noise amplifier the waveform sequence $\{U_j(iT)\}$;

converting by the analog-to-digital converter the waveform sequence $\{U_j(iT)\}$ from a continuous time representation thereof to a discrete time representation thereof;

correlating by the correlator the waveform sequence $\{U_j(iT)\}$ with a plurality of elements of the receive waveform alphabet that includes first and second waveform elements that differ therebetween in spectral content in that respective first and second bandwidths thereof differ therebetween and/or respective first and second frequency ranges thereof differ therebetween;

mapping by the receive processor the waveform sequence $\{U_j(iT)\}$ into a receive information symbol sequence $\{I_j\}$; and forming an output bit sequence by decoding by the decoder the information symbol sequence $\{I_j\}$.

28. The method according to claim 27, wherein a spectral content of the waveform sequence $\{U_j(iT)\}$ is distributed over first and second frequency intervals that are separated therebetween by a third frequency interval that is devoid of spectral content associated with the waveform sequence $\{U_j(iT)\}$.

29. The method according to claim 27, wherein the waveform sequence $\{U_j(iT)\}$ includes a variable frequency range whereby third and fourth waveform symbols of the waveform sequence $\{U_j(iT)\}$ comprise respective third and fourth frequency ranges that differ therebetween.

30. The method according to claim 29, wherein the third and fourth frequency ranges that differ therebetween, are separated therebetween by a range of frequencies that is devoid of providing frequency content to the third and fourth waveform symbols.

31. The method according to claim 27, wherein for a first value of j of the waveform sequence $\{U_j(iT)\}$, i=1, 2, ..., N; wherein for a second value of j of the waveform sequence $\{U_j(iT)\}$, i=1, 2, ..., M; wherein the first and second values of j differ therebetween; and wherein N and M differ therebetween.

32. The method according to claim 31, wherein for the first value of j a duration of a respective first waveform symbol of the waveform sequence $\{U_j(iT)\}$ comprises a first value NT and wherein for the second value of j the duration of a respective second waveform symbol of the waveform sequence $\{U_j(iT)\}$ comprises a second value MT that differs from the first value NT.

33. The method according to claim 27, wherein first and second values of j comprise respective first and second successive integer values of j; and wherein respective first and second waveform symbols of the waveform sequence $\{U_j(iT)\}$ corresponding to the first and second values of j differ therebetween in spectral content and are received by the receive antenna over respective first and second successive time intervals that are adjacent therebetween and are separated therebetween by one transmit/receive symbol interval.

34. The method according to claim 27, wherein at least one of the first and second waveform elements that differ therebetween in spectral content comprises a waveform that is generated pseudo-randomly responsive to a predetermined statistical distribution.

35. The method according to claim 34, wherein the predetermined statistical distribution comprises a Gaussian distribution.

36. The method according to claim 27, wherein the waveform sequence $\{U_j(iT)\}$ is devoid of a regularly repeating peak amplitude level.

37. The method according to claim 27, wherein the wireless receiver is devoid of a modulator and/or frequency translator and is configured to receive information by receiving and processing the waveform sequence $\{U_j(iT)\}$ without subjecting the waveform sequence $\{U_j(iT)\}$ to a modulator and/or frequency translator.

38. The method according to claim 27, wherein the wireless receiver comprises a modulator and/or frequency translator and is configured to receive information by receiving the waveform sequence $\{U_j(iT)\}$ and subjecting the waveform sequence $\{U_j(iT)\}$ to the modulator and/or frequency translator.

39. The method according to claim 27, wherein each one of the first and second waveform elements that differ therebetween in spectral content comprises a waveform that is generated pseudo-randomly; and wherein the first and second waveform elements that differ therebetween in spectral content are statistically independent and orthogonal therebetween.

40. The method according to claim 27, wherein said correlating comprises using a Fourier transform operation.

41. A system that is used to convey information; wherein the system comprises a transceiver that includes a wireless transmitter and a wireless receiver; wherein the wireless transmitter comprises a transmit antenna, a power amplifier, a digital-to-analog converter, an encoder, a transmit filter, a transmit waveform alphabet and a transmit processor; and wherein the wireless receiver comprises a receive antenna, a receive filter, a low noise amplifier, an analog-to-digital converter, a decoder, a correlator, a receive processor and a receive waveform alphabet;

wherein the transmit processor is configured to process an input bit sequence $\{b\}$ to thereby form an information symbol sequence $\{I_k\}$ that is to be transmitted; to map the information symbol sequence $\{I_k\}$ that is to be transmitted into a baseband waveform sequence $\{U_k(nT)\}$ by using first and second waveform elements of the transmit waveform alphabet that differ therebetween in spectral content in that respective first and second bandwidths thereof differ therebetween and/or respective first and second frequency ranges thereof differ therebetween; and to vary a spectral content of the baseband waveform sequence $\{U_k(nT)\}$, without resorting to conventional chipping with a binary waveform, by using the first and second waveform elements of the transmit waveform alphabet that differ therebetween in spectral content and by basing respective first and second waveform symbols of the baseband waveform sequence $\{U_k(nT)\}$ on said first and second waveform elements of the transmit waveform alphabet that differ therebetween in spectral content;

wherein k denotes discrete time; wherein for each value of k, n takes on a plurality of values; and wherein T>0;

wherein the encoder is configured to encode elements of the baseband waveform sequence $\{U_k(nT)\}$;

wherein the transmit filter is configured to filter the baseband waveform sequence $\{U_k(nT)\}$;

wherein the digital-to-analog converter is configured to convert the baseband waveform sequence $\{U_k(nT)\}$ from a discrete time representation to a continuous time representation;

wherein the power amplifier is configured to amplify the baseband waveform sequence $\{U_k(nT)\}$;

wherein the transmit antenna is configured to radiate the baseband waveform sequence $\{U_k(nT)\}$;

wherein the receive antenna is configured to receive a waveform sequence $\{U_j(iT)\}$ that includes first and second waveform symbols that differ therebetween in spectral content in that respective first and second bandwidths thereof differ therebetween and/or respective first and second frequency ranges thereof differ therebetween;

wherein j denotes discrete time and wherein for each value of j, i takes on a plurality of values;

wherein the receive filter is configured to filter the waveform sequence $\{U_j(iT)\}$;

wherein the low noise amplifier is configured to amplify the waveform sequence $\{U_j(iT)\}$;

wherein the analog-to-digital converter is configured to convert the waveform sequence $\{U_j(iT)\}$ from a continuous time representation thereof to a discrete time representation thereof;

wherein the correlator is configured to correlate the waveform sequence $\{U_j(iT)\}$ with a plurality of elements of the receive waveform alphabet that includes first and second waveform elements that differ therebetween in spectral content in that respective first and second bandwidths thereof differ therebetween and/or respective first and second frequency ranges thereof differ therebetween;

wherein the receive processor is configured to map the waveform sequence $\{U_j(iT)\}$ into a receive information symbol sequence $\{I_j\}$; and wherein the decoder is configured to decode the receive information symbol sequence $\{I_j\}$ to thereby form an output bit sequence.

42. The system according to claim 41, wherein the transmit processor is further configured to distribute a frequency content of the baseband waveform sequence $\{U_k(nT)\}$ over first and second frequency intervals that are separated therebetween by a third frequency interval and to refrain from distributing the frequency content over the third frequency interval.

43. The system according to claim 41, wherein the transmit processor is further configured to vary a frequency range that is used to provide frequency content to the baseband waveform sequence $\{U_k(nT)\}$ such that third and fourth waveform symbols of the baseband waveform sequence $\{U_k(nT)\}$ are defined over respective third and fourth frequency ranges that differ therebetween.

44. The system according to claim 43, wherein the third and fourth frequency ranges that differ therebetween, are separated therebetween by a range of frequencies that is devoid of providing frequency content to the third and fourth waveform symbols.

45. The system according to claim 41, wherein for a first value of k, n=1, 2, N; wherein for a second value of k, n=1, 2, . . . , M; wherein the first and second values of k differ therebetween; and wherein N and M differ therebetween.

46. The system according to claim 45, wherein for the first value of k a duration of a respective first waveform symbol of the baseband waveform sequence $\{U_k(nT)\}$ comprises a first value NT and wherein for the second value of k the duration of a respective second waveform symbol of the baseband waveform sequence $\{U_k(nT)\}$ comprises a second value MT that differs from the first value NT.

47. The system according to claim 41, wherein first and second values of k comprise respective first and second successive integer values of k; and wherein respective first and second waveform symbols of the baseband waveform sequence $\{U_k(nT)\}$ corresponding to the first and second values of k differ therebetween in spectral content and are radiated by the transmit antenna over respective first and second successive transmission intervals that are adjacent therebetween and are separated therebetween by one transmit/receive symbol interval.

48. The system according to claim 41, wherein at least one of the first and second waveform elements that differ therebetween in spectral content comprises a waveform that is generated pseudo-randomly responsive to a predetermined statistical distribution.

49. The system according to claim 48, wherein the predetermined statistical distribution comprises a Gaussian distribution.

50. The system according to claim 41, wherein the baseband waveform sequence $\{U_k(nT)\}$ is devoid of a regularly repeating peak amplitude level while the wireless transmitter is conveying information.

51. The system according to claim 41, wherein the wireless transmitter/receiver is/are devoid of a modulator and/or frequency translator and is/are configured to convey information by transmitting/receiving the waveform sequence $\{U_k(nT)\}/\{U_j(iT)\}$ without subjecting the waveform sequence $\{U_k(nT)\}/\{U_j(iT)\}$ to a modulator and/or frequency translator.

52. The system according to claim 41, wherein the wireless transmitter/receiver comprise(s) a modulator and/or frequency translator and is/are configured to convey information by transmitting/receiving the waveform sequence $\{U_k(nT)\}/\{U_j(iT)\}$ and subjecting the waveform sequence $\{U_k(nT)\}/\{U_j(iT)\}$ to the modulator and/or frequency translator.

53. The system according to claim 41, wherein each one of the first and second waveform elements that differ therebetween in spectral content comprises a waveform that is generated pseudo-randomly and independently of the information symbol sequence $\{I_k\}$; and wherein the first and second waveform elements that differ therebetween in spectral content are statistically independent and orthogonal therebetween.

54. A system that is used to convey information; wherein the system comprises a wireless transmitter that includes a transmit antenna, a power amplifier, a digital-to-analog converter, an encoder, a transmit filter, a transmit waveform alphabet and a transmit processor;
    wherein the transmit processor is configured to process an input bit sequence $\{b\}$ to thereby form an information symbol sequence $\{I_k\}$ that is to be transmitted; to map the information symbol sequence $\{I_k\}$ that is to be transmitted into a baseband waveform sequence $\{U_k(nT)\}$ by using first and second waveform elements of the transmit waveform alphabet that differ therebetween in spectral content in that respective first and second bandwidths thereof differ therebetween and/or respective first and second frequency ranges thereof differ therebetween; and to vary a spectral content of the baseband waveform sequence $\{U_k(nT)\}$, without resorting to conventional chipping with a binary waveform, by using the first and second waveform elements of the transmit waveform alphabet that differ therebetween in spectral content and by basing respective first and second waveform symbols of the baseband waveform sequence $\{U_k(nT)\}$ on said first and second waveform elements of the transmit waveform alphabet that differ therebetween in spectral content;
    wherein k denotes discrete time; wherein for each value of k, n takes on a plurality of values; and wherein T>0;
    wherein the encoder is configured to encode elements of the baseband waveform sequence $\{U_k(nT)\}$;
    wherein the transmit filter is configured to filter the baseband waveform sequence $\{U_k(nT)\}$;
    wherein the digital-to-analog converter is configured to convert the baseband waveform sequence $\{U_k(nT)\}$ from a discrete time representation to a continuous time representation;
    wherein the power amplifier is configured to amplify the baseband waveform sequence $\{U_k(nT)\}$; and
    wherein the transmit antenna is configured to radiate the baseband waveform sequence $\{U_k(nT)\}$.

55. The system according to claim 54, wherein the transmit processor is further configured to distribute a frequency content of the baseband waveform sequence $\{U_k(nT)\}$ over first and second frequency intervals that are separated therebetween by a third frequency interval and to refrain from distributing the frequency content over the third frequency interval.

56. The system according to claim 54, wherein the transmit processor is further configured to vary a frequency range that is used to provide frequency content to the baseband waveform sequence $\{U_k(nT)\}$ such that third and fourth waveform symbols of the baseband waveform sequence $\{U_k(nT)\}$ are defined over respective third and fourth frequency ranges that differ therebetween.

57. The system according to claim 56, wherein the third and fourth frequency ranges that differ therebetween, are separated therebetween by a range of frequencies that is devoid of providing frequency content to the third and fourth waveform symbols.

58. The system according to claim 54, wherein for a first value of k, n=1, 2, . . . , N; wherein for a second value of k, n=1, 2, . . . , M; wherein the first and second values of k differ therebetween; and wherein N and M differ therebetween.

59. The system according to claim 58, wherein for the first value of k a duration of a respective first waveform symbol of the baseband waveform sequence $\{U_k(nT)\}$ comprises a first value NT and wherein for the second value of k the duration of a respective second waveform symbol of the baseband waveform sequence $\{U_k(nT)\}$ comprises a second value MT that differs from the first value NT.

60. The system according to claim 54, wherein first and second values of k comprise respective first and second successive integer values of k; and wherein respective first and second waveform symbols of the baseband waveform sequence $\{U_k(nT)\}$ corresponding to the first and second values of k differ therebetween in spectral content and are radiated by the transmit antenna over respective first and second successive transmission intervals that are adjacent therebetween and are separated therebetween by one transmit/receive symbol interval.

61. The system according to claim 54, wherein at least one of the first and second waveform elements that differ therebetween in spectral content comprises a waveform that is generated pseudo-randomly responsive to a predetermined statistical distribution.

62. The system according to claim 61, wherein the predetermined statistical distribution comprises a Gaussian distribution.

63. The system according to claim 54, wherein the baseband waveform sequence $\{U_k(nT)\}$ is devoid of a regularly repeating peak amplitude level while the wireless transmitter is conveying information.

64. The system according to claim 54, wherein the wireless transmitter is devoid of a modulator and/or frequency translator and is configured to convey information by transmitting the waveform sequence $\{U_k(nT)\}$ without subjecting the waveform sequence $\{U_k(nT)\}$ to a modulator and/or frequency translator.

65. The system according to claim 54, wherein the wireless transmitter comprises a modulator and/or frequency translator and is configured to convey information by transmitting the waveform sequence $\{U_k(nT)\}$ following having subjected the waveform sequence $\{U_k(nT)\}$ to the modulator and/or frequency translator.

66. The system according to claim 54, wherein each one of the first and second waveform elements that differ therebetween in spectral content comprises a waveform that is generated pseudo-randomly and independently of the information symbol sequence $\{I_k\}$; and wherein the first and second waveform elements that differ therebetween in spectral content are statistically independent and orthogonal therebetween.

67. A system that is used to convey information; wherein the system comprises a wireless receiver that includes a receive antenna, a receive filter, a low noise amplifier, an analog-to-digital converter, a decoder, a correlator, a receive processor and a receive waveform alphabet;
  wherein the receive antenna is configured to receive a waveform sequence $\{U_j(iT)\}$ that includes first and second waveform symbols that differ therebetween in spectral content in that respective first and second bandwidths thereof differ therebetween and/or respective first and second frequency ranges thereof differ therebetween;
  wherein j denotes discrete time; wherein for each value of j, i takes on a plurality of values; and wherein T>0;
  wherein the receive filter is configured to filter the waveform sequence $\{U_j(iT)\}$;
  wherein the low noise amplifier is configured to amplify the waveform sequence $\{U_j(iT)\}$;
  wherein the analog-to-digital converter is configured to convert the waveform sequence $\{U_j(iT)\}$ from a continuous time representation thereof to a discrete time representation thereof;
  wherein the correlator is configured to correlate the waveform sequence $\{U_j(iT)\}$ with a plurality of elements of the receive waveform alphabet that includes first and second waveform elements that differ therebetween in spectral content in that respective first and second bandwidths thereof differ therebetween and/or respective first and second frequency ranges thereof differ therebetween;
  wherein the receive processor is configured to map the waveform sequence $\{U_j(iT)\}$ into a receive information symbol sequence $\{I_j\}$; and
  wherein the decoder is configured to decode the information symbol sequence $\{I_j\}$ thereby forming an output bit sequence.

68. The system according to claim 67, wherein a spectral content of the waveform sequence $\{U_j(iT)\}$ is distributed over first and second frequency intervals that are separated therebetween by a third frequency interval that is devoid of spectral content associated with the waveform sequence $\{U_j(iT)\}$.

69. The system according to claim 67, wherein the waveform sequence $\{U_j(iT)\}$ includes a variable frequency range whereby third and fourth waveform symbols of the waveform sequence $\{U_j(iT)\}$ comprise respective third and fourth frequency ranges that differ therebetween.

70. The system according to claim 69, wherein the third and fourth frequency ranges that differ therebetween, are separated therebetween by a range of frequencies that is devoid of providing frequency content to the third and fourth waveform symbols.

71. The system according to claim 67, wherein for a first value of j of the waveform sequence $\{U_j(iT)\}$, i=1, 2, ..., N; wherein for a second value of j of the waveform sequence $\{U_j(iT)\}$, i=1, 2, ..., M; wherein the first and second values of j differ therebetween; and wherein N and M differ therebetween.

72. The system according to claim 71, wherein for the first value of j a duration of a respective first waveform symbol of the waveform sequence $\{U_j(iT)\}$ comprises a first value NT and wherein for the second value of j the duration of a respective second waveform symbol of the waveform sequence $\{U_j(iT)\}$ comprises a second value MT that differs from the first value NT.

73. The system according to claim 67, wherein first and second values of j comprise respective first and second successive integer values of j; and wherein respective first and second waveform symbols of the waveform sequence $\{U_j(iT)\}$ corresponding to the first and second values of j differ therebetween in spectral content and are received by the receive antenna over respective first and second successive time intervals that are adjacent therebetween and are separated therebetween by one transmit/receive symbol interval.

74. The system according to claim 67, wherein at least one of the first and second waveform elements that differ therebetween in spectral content comprises a waveform that is generated pseudo-randomly responsive to a predetermined statistical distribution.

75. The system according to claim 74, wherein the predetermined statistical distribution comprises a Gaussian distribution.

76. The system according to claim 67, wherein the waveform sequence $\{U_j(iT)\}$ is devoid of a regularly repeating peak amplitude level.

77. The system according to claim 67, wherein the wireless receiver is devoid of a modulator and/or frequency translator and is configured to receive information by receiving and processing the waveform sequence $\{U_j(iT)\}$ without subjecting the waveform sequence $\{U_j(iT)\}$ to a modulator and/or frequency translator.

78. The system according to claim 67, wherein the wireless receiver comprises a modulator and/or frequency translator and is configured to receive information by receiving the waveform sequence $\{U_j(iT)\}$ and subjecting the waveform sequence $\{U_j(iT)\}$ to the modulator and/or frequency translator.

79. The system according to claim 67, wherein each one of the first and second waveform elements that differ therebetween in spectral content comprises a waveform that is generated pseudo-randomly; and wherein the first and second waveform elements that differ therebetween in spectral content are statistically independent and orthogonal therebetween.

80. The system according to claim 67, wherein the correlator is configured to correlate by using a Fourier transform operation.

* * * * *